US009036267B2

(12) United States Patent
Noda et al.

(10) Patent No.: US 9,036,267 B2
(45) Date of Patent: May 19, 2015

(54) ZOOM LENS AND IMAGING APPARATUS

(71) Applicant: FUJIFILM CORPORATION, Tokyo (JP)

(72) Inventors: Taiga Noda, Saitama-ken (JP); Michio Cho, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 9 days.

(21) Appl. No.: 14/160,716

(22) Filed: Jan. 22, 2014

(65) Prior Publication Data
US 2014/0133036 A1 May 15, 2014

Related U.S. Application Data

(63) Continuation of application No. PCT/JP2012/004849, filed on Jul. 31, 2012.

(30) Foreign Application Priority Data

Aug. 11, 2011 (JP) ................................. 2011/175547

(51) Int. Cl.
*G02B 15/14* (2006.01)
*G02B 15/173* (2006.01)
(Continued)

(52) U.S. Cl.
CPC .............. *G02B 15/14* (2013.01); *G02B 15/173* (2013.01); *G02B 27/646* (2013.01); *G03B 17/04* (2013.01)

(58) Field of Classification Search
CPC ...... G02B 15/00; G02B 15/16; G02B 13/004; G02B 13/009; G02B 15/155
USPC ................................................. 359/686, 680
See application file for complete search history.

(56) References Cited

U.S. PATENT DOCUMENTS

2007/0014031 A1 1/2007 Kohno et al.
2007/0091200 A1 4/2007 Yamaguchi et al.
(Continued)

FOREIGN PATENT DOCUMENTS

JP 2003-207715 7/2003
JP 2006-259215 9/2006
(Continued)

OTHER PUBLICATIONS

International Search Report PCT/JP2012/004849 dated Oct. 9, 2012, with English Translation.

*Primary Examiner* — Scott J Sugarman
*Assistant Examiner* — William R Alexander
(74) *Attorney, Agent, or Firm* — Young & Thompson

(57) ABSTRACT

A zoom lens includes a first lens-group having positive refractive power, a second lens-group having negative refractive power, a third lens-group having positive refractive power, and a fourth lens-group having positive refractive power, in this order from an object side, and a stop located between a most image-side surface of the second lens-group and a most image-side surface of the third lens-group. Distances between the lens-groups change when magnification is changed from a wide-angle end to a telephoto end. The second lens-group consists of a negative lens, a biconcave lens and a positive lens in this order from the object side. The third lens-group consists of a positive lens, a cemented lens of a positive lens and a negative lens, a negative meniscus lens with its concave surface facing the object side, and a biconvex lens in this order from the object side. A predetermined conditional formula is satisfied.

10 Claims, 13 Drawing Sheets

(51) Int. Cl.
*G02B 27/64* (2006.01)
*G03B 17/04* (2006.01)

(56) References Cited

U.S. PATENT DOCUMENTS

| | | |
|---|---|---|
| 2007/0109664 A1 | 5/2007 | Yagyu et al. |
| 2011/0122508 A1* | 5/2011 | Miwa et al. ............. 359/687 |
| 2011/0188130 A1* | 8/2011 | Sato ....................... 359/687 |

FOREIGN PATENT DOCUMENTS

| | | |
|---|---|---|
| JP | 2007-025123 | 2/2007 |
| JP | 2007-114447 | 5/2007 |
| JP | 2007-139863 | 6/2007 |
| JP | 2007-219040 | 8/2007 |
| JP | 2010-217478 | 9/2010 |
| JP | 2012-042927 | 3/2012 |

* cited by examiner

ZOOM LENS AND IMAGING APPARATUS

BACKGROUND OF THE INVENTION

1. Field of the Invention

The present invention relates to a zoom lens and an imaging apparatus. In particular, the present invention relates to a zoom lens appropriate for a digital camera, a video camera and the like, and to an imaging apparatus including the zoom lens.

2. Description of the Related Art

In recent years, as personal computers spread to ordinary families, digital cameras that can input image information, such as a landscape and a portrait, obtained by photography to personal computers became widely used. Since the function of the digital cameras became higher recently, a demand for a digital camera with a high-magnification zoom lens mounted thereon is increasing.

Therefore, for example, a zoom lens with a high magnification ratio, as disclosed in Japanese Unexamined Patent Publication No. 2007-219040 (Patent Document 1), is used. The zoom lens consists of a first lens group having positive refractive power, a second lens group having negative refractive power, a third lens group having positive refractive power and a fourth lens group having positive refractive power, which are in this order from an object side. The magnification of the zoom lens is changed by changing distances between the groups Japanese Unexamined Patent Publication No. 2003-207715 (Patent Document 2) discloses a zoom lens with similar basic structure to that of Patent Document 1. Patent Document 2 discloses, as a four-group zoom-type zoom lens with a high magnification ratio, a zoom lens having a small Fno. at a wide angle end while achieving a high variable magnification ratio. Japanese Unexamined Patent Publication No. 2010-217478 (Patent Document 3) discloses a zoom lens having excellent optical performance while achieving a high magnification ratio.

SUMMARY OF THE INVENTION

However, in recent years, a need for a zoom lens having a small Fno. and high image qualities while achieving small size and a high magnification ratio is also increasing. The zoom lenses disclosed in Patent Document 1 and Patent Document 2 have a large Fho. at a wide angle end or at a telephoto end. Therefore, a lens having a smaller Fno. is needed. Further, in the zoom lens disclosed in Patent Document 3, the ratio of the total length of the entire lens to an image size is large. Therefore, further reduction in size is needed.

In view of the foregoing circumstances, it is an object of the present invention to provide a zoom lens with excellent optical performance achieving a small Fno, and high image qualities while the size of the zoom lens is small and the magnification ratio of the zoom lens is high, and an imaging apparatus including the zoom lens.

A zoom lens of the present invention is a zoom lens substantially consisting of four lens groups of:

a first lens group having positive refractive power;
a second lens group having negative refractive power;
a third lens group having positive refractive power; and
a fourth lens group having positive refractive power, which are in this order from an object side; and
a stop located between a most image-side surface of the second lens group and a most image-side surface of the third lens group, wherein distances between the lens groups change when magnification is changed from a wide angle end to a telephoto end, and wherein the second lens group consists of a negative lens, a biconcave lens and a positive lens in this order from the object side, and wherein the third lens group consists of a positive lens, a cemented lens of a positive lens and a negative lens, a negative meniscus lens with its concave surface facing the object side, and a biconvex lens, which are in this order from the object side, and wherein the following conditional formula (1) is satisfied:

$$-0.75<(R6+R7)/(R6-R7)<0.50 \qquad (1),\text{ where}$$

R6: a paraxial curvature radius of an object-side surface of the biconcave lens in the second lens group, and R7: a paraxial curvature radius of an image-side surface of the biconcave lens in the second lens group.

In the present invention, each "lens group" does not necessarily consist of plural lenses. Lens groups may include a lens group consisting of only one lens.

The expression "substantially consisting of four lens groups" means that a zoom lens of the present invention includes a lens substantially without refractive power, an optical element, such as a stop and a cover glass, which is not a lens, a mechanism part, such as a lens flange, a lens barrel, an imaging device and a hand shake blur correction mechanism, and the like besides the four lens groups.

It is desirable that the zoom lens according to the embodiment of the present, invention satisfies the following conditional formula (2):

$$0.005<D7/fw<0.150 \qquad (2),\text{ where}$$

D7: a distance on an optical axis between the image-side surface of the biconcave lens in the second lens group and an object-side surface of the positive lens in the second lens group, and fw: a focal length of an entire lens system at the wide angle end.

It is desirable that the zoom lens according to the embodiment of the present invention satisfies the following conditional formula (3):

$$1.9<f3/fw<2.6 \qquad (3),\text{ where}$$

f3: a focal length of the third lens group, and fw: a focal length of an entire lens system at the wide angle end.

It is desirable that the zoom lens according to the embodiment of the present invention satisfies the following conditional formula (4):

$$6.6<f1/fw<8.5 \qquad (4),\text{ where}$$

f1: a focal length of the first lens group, and fw: a focal length of an entire lens system at the wide angle end.

In the zoom lens of the present invention, it is desirable that displacement of an image caused by vibration of the zoom lens is corrected by moving the third lens group in a direction orthogonal to an optical axis.

An imaging apparatus of the present invention includes the aforementioned zoom lens of the present invention.

The zoom, lens of the present invention includes first through fourth lens groups having positive refractive power, negative refractive power, positive refractive power: and positive refractive power, respectively, in this order from an object side, and a stop-located between a most image-side surface of the second lens group and a most image-side surface of the third lens group. Further, distances between the lens groups change when magnification is changed from a wide angle end to a telephoto end. The second lens group consists of a negative lens, a biconcave, lens and a positive lens in this order from the object side. Further, the third lens group consists of a positive lens, a cemented lens of a positive lens and a negative lens, a negative meniscus lens with its concave surface facing the object side, and a biconvex lens, which are in this order from the object side. Therefore, it is possible to achieve excellent optical performance realizing a small Fno. and high image qualities while the size of the zoom lens is small and the magnification ratio of the zoom lens is high. Further, the zoom lens of the present invention satisfies conditional formula (1). Therefore, it is possible to appropriately maintain the total length of the lens and the negative refractive power of the biconcave lens. Further, it is possible to suppress a fluctuation of aberrations during magnification change and various aberrations.

In the present invention, when conditional formula (2) is satisfied, it is possible to prevent a distance, on the optical axis, between the biconcave lens in the second lens group and the positive lens in the second lens group from too greatly influencing a longitudinal aberration. Further, it is possible to reduce the size of the second, lens group while suppressing generation, of a spherical aberration.

Further, when the present invention satisfies conditional formula (3), it is possible to more excellently correct a spherical aberration, and to reduce Fno. while maintaining the small size of the zoom lens. Further, when the present invention satisfies conditional formula (4), it is possible to reduce the size of the zoom lens while excellently correcting a longitudinal aberration.

When displacement of an image caused by vibration of the zoom lens is corrected by moving the third lens group in a direction ) orthogonal to an optical axis, it is possible to more excellently correct various aberrations caused by vibration of the zoom lens.

The imaging apparatus of the present invention includes the high performance zoom lens of the present invention. Therefore, it is possible to reduce the size of the whole apparatus, and to increase the magnification, and to obtain photographic images with higher image qualities.

DESCRIPTION OF THE PREFERRED EMBODIMENTS

Next, embodiments of the present, invention will be described in detail with reference to drawings.

Figure 1:
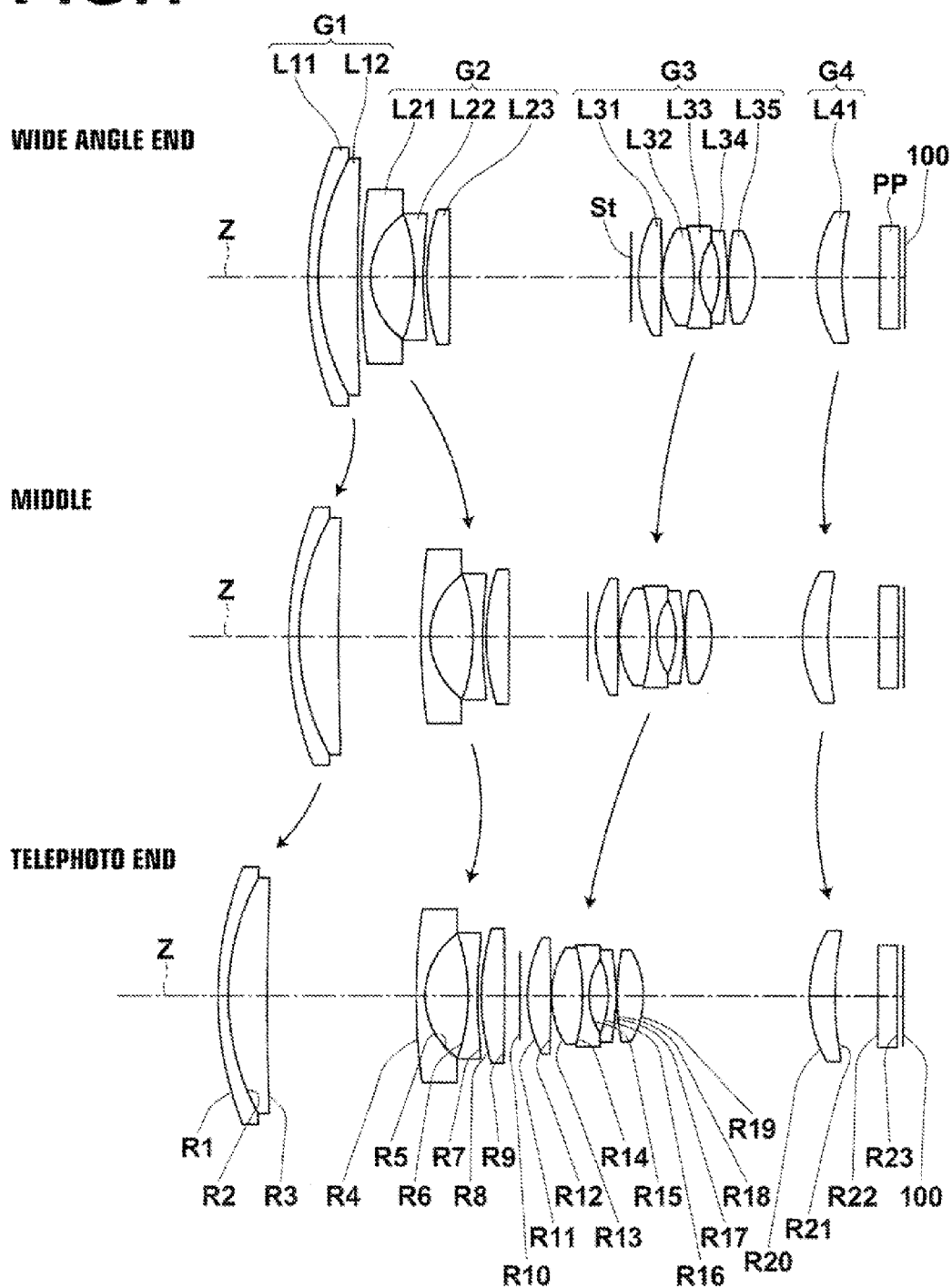
FIG. 1 is a cross section illustrating the lens structure of a zoom lens in Example 1 of the present invention.
Figure 2:
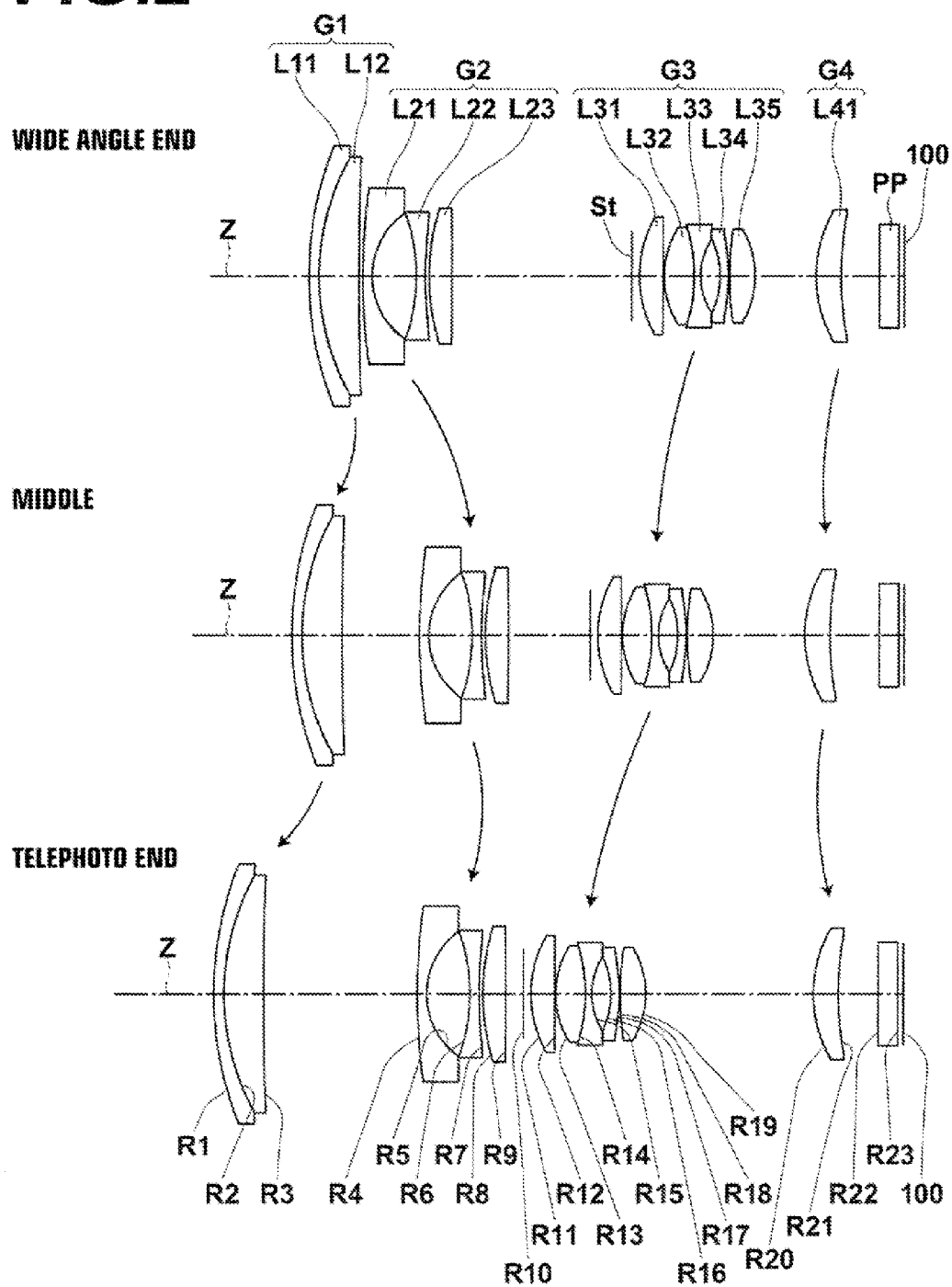
FIG. 2 is a cross section illustrating the lens structure of a zoom lens in Example 2 of the present invention.

FIG. 1 is a cross section illustrating the structure of a zoom lens according to an embodiment of the present invention, and corresponds to a zoom lens in Example 1, which will be described later. FIG. 2 through FIG. 6 are cross sections illustrating the structure of zoom, lenses in Example 2 through Example 6, which will be described later, respectively. The basic structure of the zoom lenses illustrated in FIG. 1 through FIG. 6 is similar to each other/and an illustration method is also similar. Therefore, the zoom lens illustrated in FIG. 1 will be mainly described, as an example.

Here, the left side of FIG. 1 is an object side, and the right side of FIG. 1 is an image side. In FIG. 1, the top part illustrates the arrangement of lenses when the zoom lens is focused on an object at infinity at a wide angle end, and the middle part illustrates the arrangement of lenses when the zoom lens is focused on an object at infinity at a middle position, and the bottom part illustrates the arrangement of lenses when the zoom lens is focused on an object at infinity at a telephoto end. Solid-line curves between the top part and a middle part and solid-line curves between the middle part and the bottom part schematically illustrate paths of movement of the lens groups during magnification change.

The zoom lens illustrated in FIG. 1 includes first lens group G1 having positive refractive power, second lens group G2 having negative refractive power, third lens group G3 having positive refractive power, and fourth lens group G4 having positive refractive power, which are in this order along optical axis 2 from an object side. The zoom lens is structured in such a manner that distances between the lens groups change when magnification is changed from a wide angle end to a telephoto end. Specifically, in the zoom lens of the present invention, a distance between first lens group G1 and second lens group G2, a distance between second lens group G2 and third lens group G3, and a distance between third lens group G3 and fourth lens group G4 change when magnification is changed from a wide angle end to a telephoto end. Further, aperture stop St is arranged between second lens group G2 and third lens group G3.

For example, in the zoom lens illustrated in FIG. 1, the lens groups move in such a manner to draw paths indicated by arrows in the diagram when magnification is changed from a wide angle end to a telephoto end. Specifically, each of four lens groups, i.e., first lens group G1, second lens group G2, third lens group G3 and fourth lens group G4, moves in the direction of the optical axis in such a manner that a distance between first lens group G1 and second lens group G2 increases, and a distance between second lens group G2 and third lens group G3 decreases, and a distance between third lens group G3 and fourth lens group G4 increases. Further, a distance between fourth lens group G4 and an image formation surface 100 also changes during magnification change. In the example of the zoom lens illustrated in FIG. 1, aperture stop St moves in such a manner to be integrated with third lens group G3 during magnification change.

Aperture stop St illustrated in FIG. 1 does not necessarily represent the size nor the shape of aperture stop St, but the position of aperture stop St on optical axis 2.

When the zoom lens is applied to an imaging apparatus, it is desirable to arrange a cover glass, various filters, such as an infrared cut filter and a low-pass filter, and the like between the most image-side lens and the image formation surface (imaging surface) 100 based on the structure of a camera on which the lens is mounted. FIG. 1 illustrates an example in which parallel-fiat-plate-shaped optical member PP, which is assumed, to be such members, is arranged on the image side of fourth lens group G4.

In the example illustrated in FIG. 1, for example, when the zoom lens is applied to an imaging apparatus, an imaging surface of an imaging device is arranged at the image formation surface 100.

The structure of each lens group of the zoom lens illustrated in FIG. 1 will be described in detail.

First lens group G1, as a whole, has positive refractive power. Here, first lens group G1 consists of a cemented lens of negative lens L11 and positive lens L12 in this order from the object side.

Second lens group G2, as a whole, has negative refractive power. It is desirable that second lens group G2 consists of negative lens L21, biconcave lens L22, and positive lens L23 in this order from the object side. Further, it is desirable that at least one of the surfaces of biconcave lens L22 in second lens group G2 is aspherical. Here, both surfaces of biconcave lens L22 are aspherical.

Third lens group G3, as a whole, has positive refractive power. Third lens group G3 consists of positive lens L31, a cemented lens of positive lens L32 and negative lens L33, negative meniscus lens L34 with its concave surface facing the object side, and biconvex positive lens L35 in this order from the object side.

Regarding negative lens L34 and biconvex lens L35, which are the first lens and the second lens from the image side in third lens group G3, in other words, two most image-side lenses in third lens group G3, it is desirable that three surfaces of four surfaces of the two lenses are convex surfaces, as in the example illustrated in FIG. 1.

Further, as in the example illustrated in FIG. 1, it is desirable that the image-side surface of negative meniscus lens L34 is an aspherical surface in which positive refractive power becomes weaker irons, the optical axis toward the periphery of the surface.

Further, the object-side surface of negative meniscus lens L34 may be aspherical. Further, a surface or both surfaces of most object-side positive lens L31 may be aspherical. Here, the object-side surface of positive lens L31 is aspherical.

It is desirable that displacement of an image caused by vibration of the zoom lens is corrected by moving third lens group G3 in a direction orthogonal to the optical axis.

Fourth lens group G4, as a whole, has positive refractive power. Here, fourth lens group G4 consists of one lens of positive lens L41.

Further, this zoom lens satisfies the following conditional formula (1):

$$-0.75 < (R6+R7)/(R6-R7)/(R6-R7) < 0.50 \quad (1),$$ where

R6: a paraxial curvature radius of an object-side surface, of the biconcave lens in the second lens group, and R7: a paraxial curvature radius of an image-side surface of the biconcave lens in the second lens group.

Further, it is desirable that this zoom lens satisfies the following conditional formulas (2) through (6). A desirable mode may satisfy one of conditional formulas (2) through (6). Alternatively, an arbitrary combination of formulas (2) through (6) may be satisfied:

$$0.005 < D7/fw < 0.150 \quad (2);$$

$$1.9 < f3/fw < 2.6 \quad (3);$$

$$6.6 < f1/fw < 8.5 \quad (4);$$

$$5.5 < fw \cdot \tan\omega < 7.0 \quad (5); \text{ and}$$

$$36 < \omega 21\ 44 \quad (6), \text{ where}$$

D7: a distance on an optical axis between the image-side surface of the biconcave lens in the second lens group and an object-side surface of the positive lens in the second lens group, f3: a focal length of the third lens group, f1: a focal length of the first lens group, fw: a focal length of the entire lens system at a wide angle end, and ω: a half angle of view.

In the zoom lens according to the embodiment of the present invention, if is desirable that a specific material arranged on the most object side is glass. Alternatively, transparent ceramic may be used.

As the material of a lens on which an aspherical surface is formed, glass may be used. Alternatively, plastic may be used. When plastic is used, it is possible to reduce the weight and the cost.

Further, it is desirable that a multi-layer coating for protection is applied to the zoom lens according to the embodiment of the present invention. Further, an anti-reflection coating for reducing ghost light or the like during usage may be applied besides the coating for protection.

FIG. 1 illustrates an example in which optical, member FP is arranged between the lens system and an image formation surface. Instead of arranging various filters, such as a low-pass filter and a filter that cuts a specific wavelength band, or the like, these various filters may be arranged between lenses. Alternatively, a coating having an action similar to the various filters maybe applied to one of the lens surfaces of the lenses.

An aperture stop may be arranged at any position as long as the aperture stop is located between the most image-side surface of the second lens group and the most image-side surface of the third lens group. Farther, whether the aperture stop moves or not is not limited to the aforementioned example. For example, the aperture stop may be fixed during magnification change. Alternatively, the aperture stop may move independently of lens groups.

The action and the effect of the zoom lens, which is structured as described above, will be described.

As described above, the zoom lens illustrated in FIG. 1 includes the first through fourth lens groups, which are a positive lens group, a negative lens group, a positive lens group and a positive lens group, in this order from the object side, and a stop located between the most image-side surface in the second lens group and the most image-side surface in the third lens group. In the zoom lens, distances between the lens groups change when magnification is changed from a wide angle end to a telephoto end. Second lens group G2 consists of a negative lens, a biconcave lens and a positive lens in this order from the object side. Further, the third lens group consists of a positive lens, a cemented lens of a positive lens and a negative lens, a negative meniscus lens with its concave surface facing the object side, and a biconvex lens in this order from the object side. Therefore, it is possible to achieve excellent optical performance with a small Fno. and high image qualities while the zoom lens has small size and a high magnification ratio. Especially, this structure can reduce the amount of movement of third lens group G3, which is located in the vicinity of aperture stop St, during magnification change, compared with conventional structure. In other words, it is possible to make the amount of movement of the lens group located next to and on the image side of aperture stop St from the image formation surface small. Therefore, it is possible -to achieve a small Fno. both at a telephoto end and at a wide angle end. In contrast, for example, in Example 1 of Patent Document 1, Fno. is large at a telephoto end and at a wide angle end. In Patent Document 2, Fno. is large at a telephoto end.

Further, the aforementioned structure can optimize the refractive power of each lens group. Therefore, it is possible to realize a zoom lens that can cope with an image size, for example, such as 2/3 inch type, which is larger than a conventional image size, while reducing the total length of the zoom lens. Accordingly, it is possible to satisfy a need in development that a larger size image sensor is to be adopted to improve image qualities of digital cameras or the like. In contrast, for example, in the zoom, lens disclosed in Patent Document 3, the total length, of the zoom, lens is relatively too long, compared with the image size. Therefore, it is impossible to realize an image size corresponding to a large image sensor, such as ⅔ inch type, while maintaining the compactness of the zoom lens in total length.

Further, in Patent Document 2, an angle of view at a wide angle end is small. In contrast, the zoom lens of the aforementioned structure can achieve the aforementioned effect, while maintaining the angle of view at a wide angle end.

Further, since first lens group G1 consists of two lenses, it is possible to make the thickness (a length in the direction of the optical axis) of first lens group G1 small, and to reduce the size. Further, when negative lens L11 and positive lens L12 are a cemented lens, it is possible to make an air space between negative lens L11 and positive lens L12 zero. That contributes to reduction in the thickness of first lens group G1. Further, since the number of lenses in first lens group G1 is suppressed, it is possible to reduce the cost.

Further, second lens group G2 includes biconcave lens L22, which is the second lens from the object side. Therefore, it is possible to appropriately suppress a fluctuation of aberrations during magnification change, while securing sufficient negative refractive power of second lens group G2. Further, it is possible to effectively suppress various aberrations generated in second lens group G2.

Further, second lens group G2 consists of only single lenses. Therefore, the number of surfaces that contact with air is large, compared with a case in which second lens group G2 includes a cemented lens. That is advantageous to correction of aberrations when the angle of view is increased.

Third lens group G3 includes negative meniscus lens L34 with its concave surface facing the object side. Therefore, it is possible to balance various aberrations at a periphery of the angle of view, while maintaining the short total length of the zoom lens. Further, regarding two lenses located, on the most image side of third lens group G3, three surfaces of the four surfaces of the two lenses are convex. Therefore, it is possible to reduce the size of the zoom lens, compared with the zoom lens disclosed in Patent Document 1 and the zoom, lens disclosed in Patent Document 2, while excellently correcting a spherical aberration and astigmatism.

When the image-side surface of negative meniscus lens L34 is an aspherical surface in which its positive refractive power becomes weaker from the optical axis toward the periphery of the surface, it is possible to excellently correct a spherical aberration even through the spherical aberration tends to increase as Fho. becomes smaller.

When positive lens L32 and negative lens L33 in the third lens group are a cemented lens, that contributes to reduction in the length (thickness) of third lens group G3 in the direction of the optical axis. Further, it is possible to excellently correct chromatic aberrations and other various aberrations.

When displacement of an image caused by vibration of the zoom lens is corrected by moving third lens group G3 in a direction orthogonal to the optical axis, it is possible to more excellently correct various aberrations caused by vibration of the zoom lens by moving the whole third lens group G3 even if the room, lens has a small Fho. as illustrated in FIG. 1. In contrast, when a part of third lens group G3, for example, only one lens in the third lens group is moved in the orthogonal direction as in Patent Document 2, it is impossible to sufficiently correct various aberrations of the zoom lens having a small Fno. as illustrated in FIG. 1 during vibration of the zoom lens.

When fourth lens group G4 consists of one lens, that contributes to reduction of the total length of the entire zoom lens, which is desirable. Further, it is possible to structure fourth lens group G4 in light weight. Therefore, quick focusing is easy when focusing is performed by fourth lens group G4.

Conditional formula (1) defines desirable ranges of paraxial curvature radius R6 of the object-side surface and paraxial curvature radius R7 of the image-side surface of biconcave lens L22 included in second lens group G2. If the value is lower than the lower limit of conditional formula (1), it becomes difficult to maintain the negative refractive power of biconcave lens L22 while maintaining the balance of aberrations, and that is not desirable. For example, when the value is lower than, the lower limit of conditional formula (1), the amount of movement of the second group during magnification change may be increased to maintain the negative refractive power of biconcave lens L22. However, the total length of the entire zoom lens tends to increase to cope with the increase in the amount of movement of the second group. If the value exceeds the upper limit of conditional formula (1), a fluctuation of aberrations during magnification change increases, and various aberrations caused by second lens group G2 increase. Therefore, when conditional formula (1) is satisfied, it is possible to appropriately maintain the total lens length and the negative refractive power of the biconcave lens. Further, it is possible to suppress various aberrations generated by second lens group G2.

It is desirable that the numerical value range of conditional formula (1) is as follows to obtain more excellent optical performance while reducing the total length:

$$-0.60<(R6+R7)/(R6-R7)<0.30 \qquad (1\text{-}1).$$

Conditional formula (2) defines a desirable range of the ratio of distance D7 on an optical axis between the image-side surface of biconcave lens L22 in second lens group G2 and the object-side surface of positive lens L23 in second lens group G2 and focal length fw. If the value is lower than the lower limit of conditional formula (2), distance D7 on the optical axis between biconcave lens L22 and positive lens L23 in second lens group G2 too greatly influences a longitudinal aberration. Therefore, the optical performance of the lens tends to fluctuate as D7 fluctuates by a production error or the like, and that is not desirable in quality control. If the value exceeds the upper limit of conditional formula (2), the size of second lens group G2 increases, and that is not desirable. For example, if the size of second lens group G2 becomes large, axial rays passing through second lens group G2 become large. Consequently, axial rays passing through, third lens group G3 and fourth lens group G4, which follow second lens group G2, also become large. Therefore, a spherical aberration tends to be generated. Hence, when conditional formula (2) is satisfied/it is possible to prevent distance D7, on the optical axis, between biconcave lens L22 and positive lens L23 in second lens group G2 from too greatly influencing a longitudinal aberration. Further, it is possible to reduce the size of second lens group G2, while suppressing generation of a spherical aberration. Therefore, it is more desirable that the numerical value range of conditional formula (2) is as follows:

$$0.04 < D7/fw < 0.09 \quad (2\text{-}1)$$

Conditional formula (3) defines a desirable range of the ratio of the focal length of third lens group G3 and the focal length at a wide angle end of the entire zoom lens. If the value is lower than the lower limit of conditional formula (3), that is advantageous to reduction of the total length of the entire zoom lens and achievement of a small Fno., but a spherical aberration tends to increase. If the value exceeds the upper limit of conditional formula (3), the refractive power of third lens group G3 becomes weak. Therefore, it becomes difficult to reduce Fno., while keeping the total length of the zoom lens short. Therefore, when third lens group G3 and the other lens groups are structured so as to satisfy conditional formula (3), it is possible to reduce the Fno. of the zoom lens while suppressing a spherical aberration and an increase in the total length of the zoom lens. It is desirable that the numerical value range of conditional formula (3) is as follows to obtain more excellent optical performance while reducing the total length;

$$2.1 < f3/fw < 2.3 \quad (3\text{-}1)$$

Conditional formula (4) defines a desirable range of the ratio of the focal length of first lens group G1 and the focal length at a wide angle end of the entire zoom lens. If the value is lower than the lower limit of conditional formula (4), the refractive power of first lens group G1 becomes strong. Therefore, distortion tends to increase, and a longitudinal aberration at a telephoto end tends to increase. If the distortion and the longitudinal aberration increase, it becomes necessary to take further measures, such as addition of a lens and change of a spherical lens to an aspherical lens, and that is not desirable. If the value exceeds the upper limit of conditional formula (4), the refractive power of first lens group G1 becomes weak. Therefore, it becomes necessary to increase the amount of movement of first lens group G1 during magnification change. Therefore, it becomes difficult to keep the total length of the zoom lens at a telephoto end short. Therefore, when first lens group G1 and the other lens groups are structured so as to satisfy conditional formula (4), it is possible to suppress an increase of distortion and to suppress an increase of a longitudinal aberration at a telephoto end. Further, it is possible to maintain the compactness of the zoom lens in total length. It is desirable chat the numerical value range of conditional formula (4) is as follows to obtain more excellent optical performance while reducing the total length:

$$7.3 < f1/fw < 7.8 \quad (4\text{-}1)$$

Conditional formula (5) defines the range of the product of a half angle of view and a focal length of the entire system at a wide angle end. If the value is lower than the lower limit of conditional formula (5), the total length of the zoom lens is relatively large, compared with the image size. Therefore, it becomes difficult to cope with a large image size. If the value exceeds the upper limit of conditional formula (5), the lens diameter tends to increase. Therefore, when conditional formula (5) is satisfied, it is possible to realize a zoom lens that can cope with a large image size while maintaining the compactness of the lens diameter and the compactness of the zoom lens in total length.

Conditional formula (6) defines a desirable range of a half angle of view. If the value is lower than the lower limit of conditional formula (6), it becomes difficult to perform photography even in a wide-angle range. If the value exceeds the upper limit of conditional formula (6), distortion increases. Further, it is necessary to increase the lens diameter. Therefore, it becomes difficult to reduce the size of the zoom lens. Hence, when conditional formula (6) is satisfied, it is possible to easily correct distortion, and to realize a zoom lens that has small size and a wide angle of view.

As described above, in the zoom lens according to the embodiment of the present invention, the lens structure of the zoom lens consisting of four groups is optimized and an appropriate conditional formula or formulas are appropriately satisfied. Therefore, it is possible to maintain excellent optical performance achieving a small Fno. and high image qualities while the zoom lens has small size and a high magnification ratio. Further, according to an imaging apparatus on which the zoom lens according to the embodiment of the present invention is mounted, it is possible to reduce the size of the whole apparatus while excellent imaging performance with a high variable magnification ratio is maintained.

Figure 3:
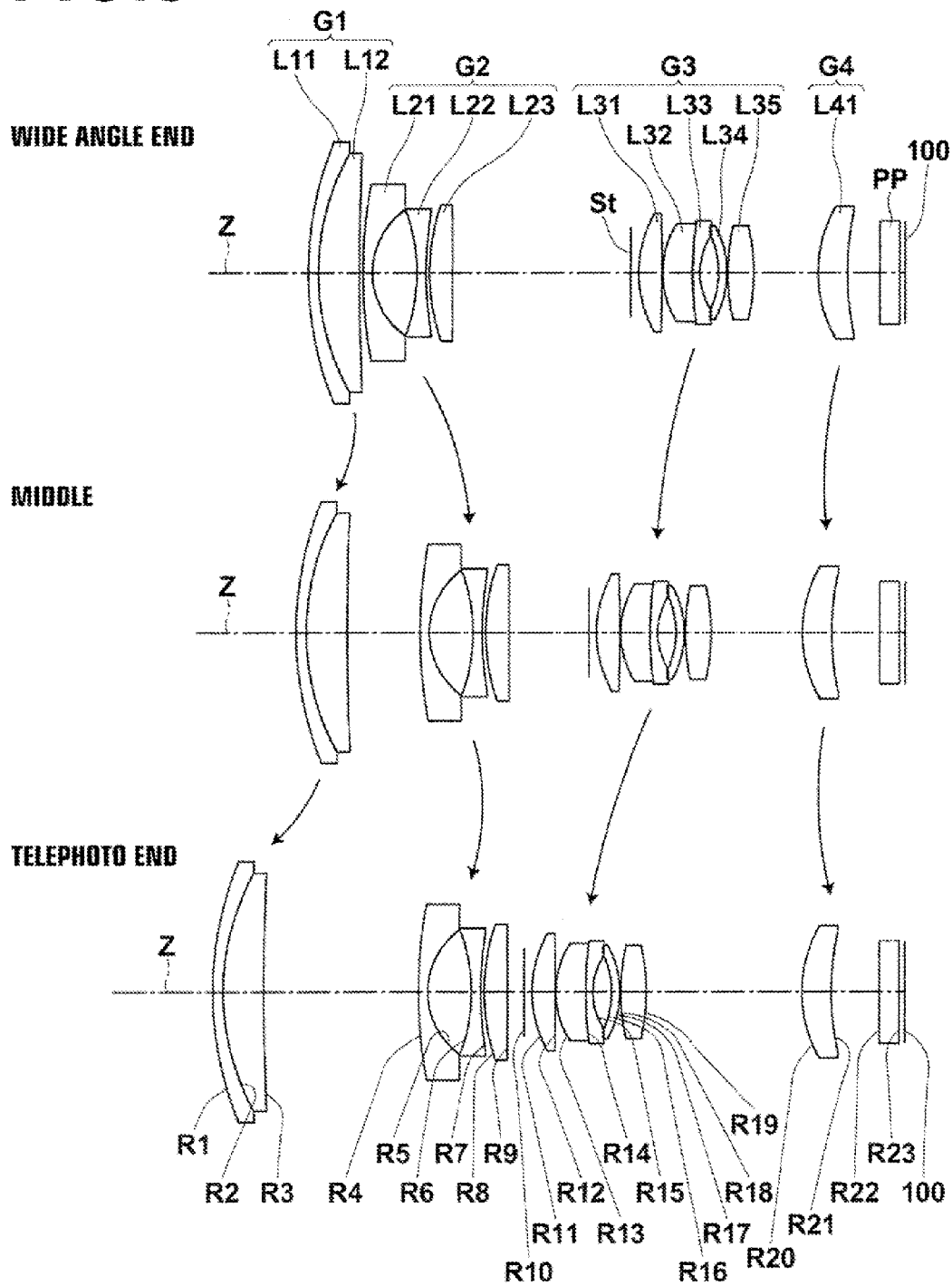
FIG. 3 is a cross section illustrating the lens structure of a zoom lens in Example 3 of the present invention.
Figure 4:
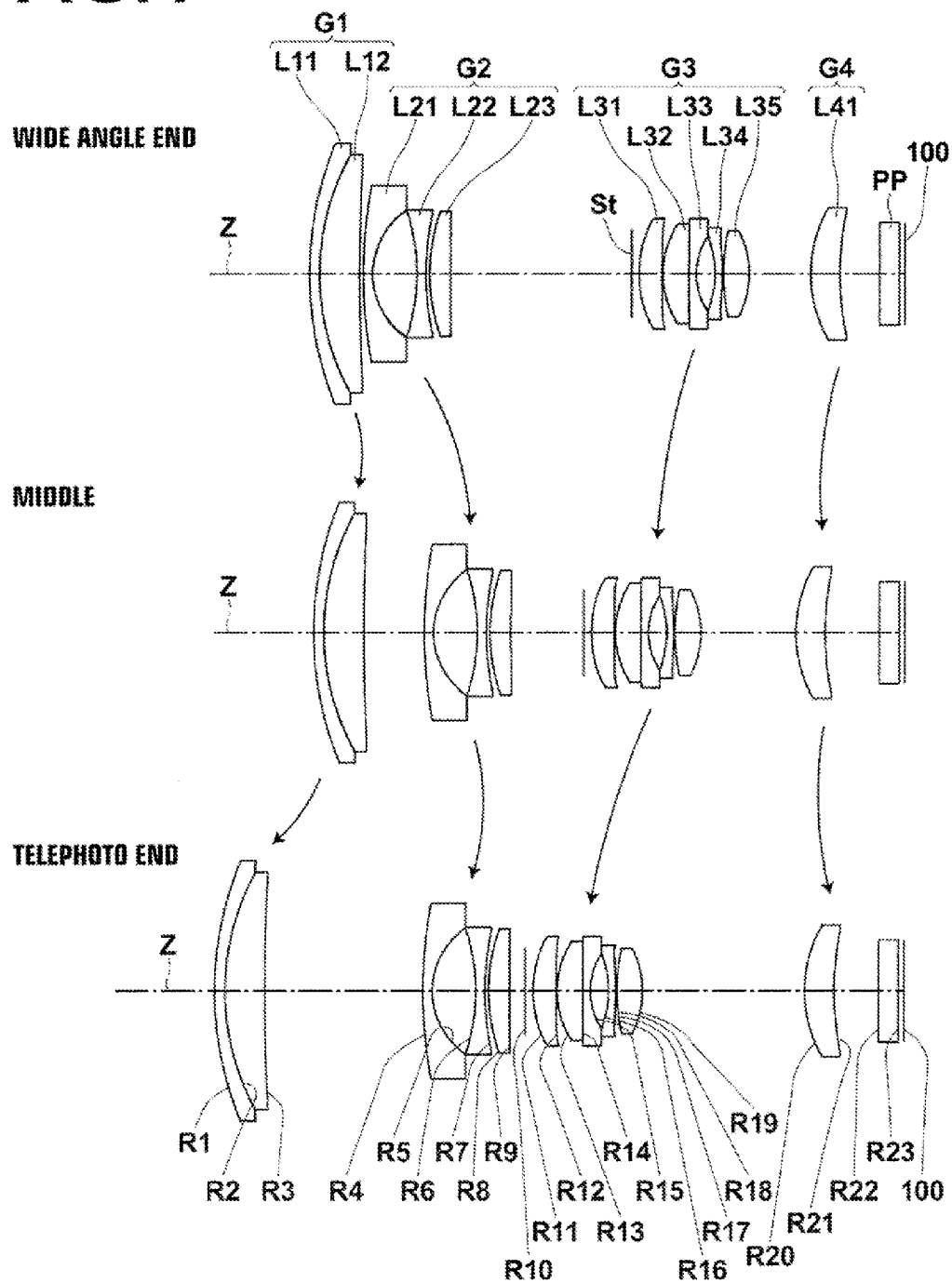
FIG. 4 is a cross section illustrating the lens structure of a zoom lens in Example 4 of the present invention.
Figure 5:
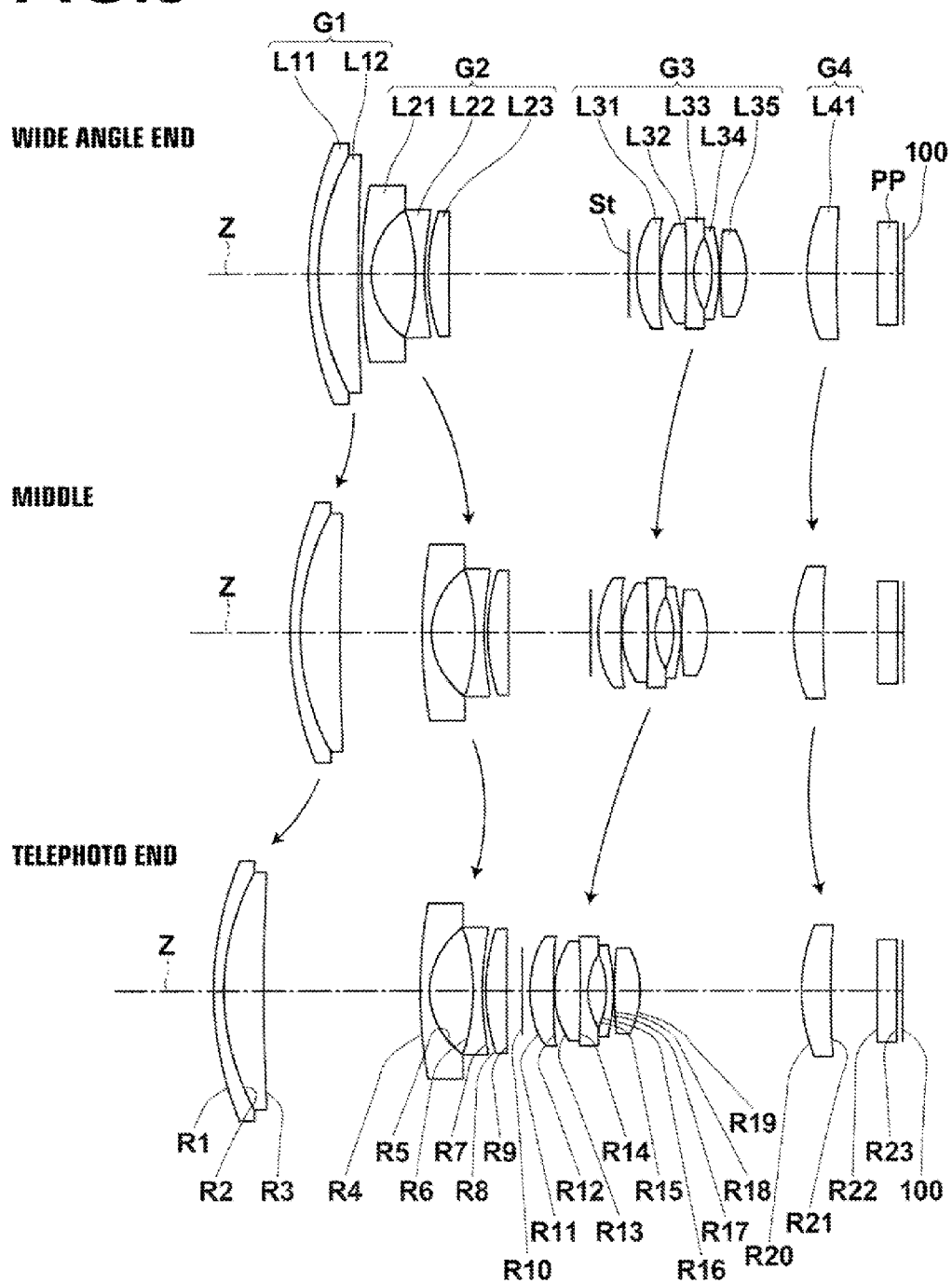
FIG. 5 is a cross section illustrating the lens structure of a zoom lens in Example 5 of the present invention.
Figure 6:
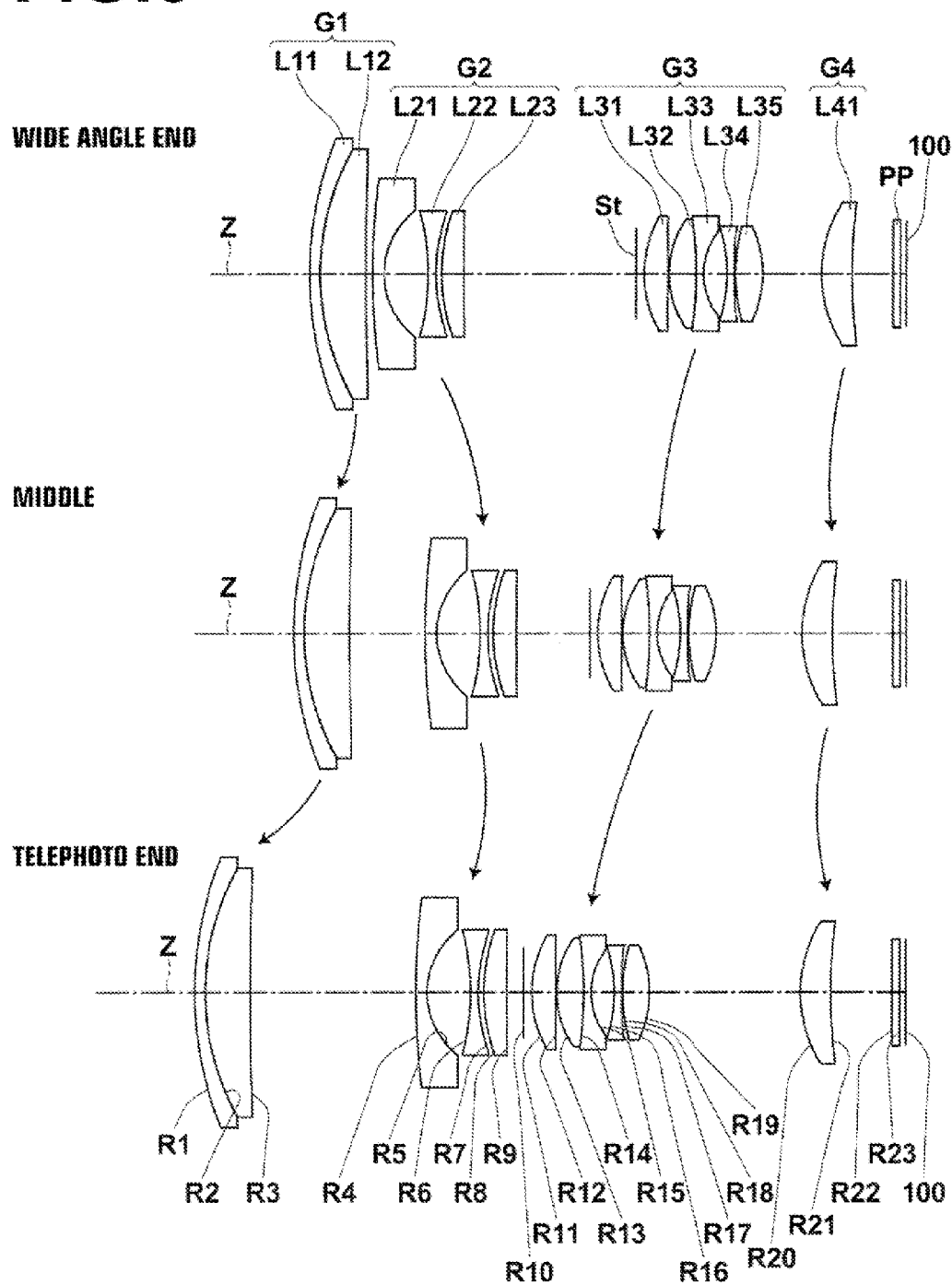
FIG. 6 is a cross section illustrating the lens structure of a zoom lens in Example 6 of the present invention.

Next, numerical value examples of the zoom lens of the present invention will be described. FIG. 3, through FIG. 6 illustrate lens cross sections of zoom lenses of Example 1 through Example 6, respectively.

Table 1 through Table 3, which will be shown later, show specific lens data corresponding to the structure of the zoom lens illustrated in FIG. 1. Specifically, Table 1 shows lens data of the zoom lens in Example 1, and Table 2 shows aspherical surface data of the zoom lens, and Table 3 shows variable magnification data and various data of the zoom lens. Similarly, Table 4 through Table 18 show lens data, aspherical surface data and variable magnification data of the zoom lenses in Examples 2 through 6. Next, the meanings of signs in the tables will be described, using Example 1 as an example.

The meaning of signs in the tables of Examples 2 through 6 are basically similar.

In the lens data of Table 1, Si shows the surface numbers of i-th (i=1, 2, 3, ...) surfaces. The surface number of the most object-side surface of the structure elements is one, and the surface numbers sequentially increase toward the image side. Ri shows the curvature radius of the i-th surface. Di shows a distance, on optical axis Z, between the i-th surface and the (i+1)th surface. In the column of the distance between surfaces, the lowest row shows a distance between the last surface in the table and an image formation surface. In the lens data of Table 1, Ndj shows the refractive index of a j-th (j=1, 2, 3, ...) optical element for d-line (wavelength is 587.6 nm) when the most object-side lens is the first, optical element, and the value of j sequentially increases toward the image side. Further, vdj shows the Abbe number of the j-th optical element for d-line. The lens data include aperture stop St and optical member PP. The term "(APERTURE STOP)" is written for a surface corresponding to aperture stop St in the column of curvature radius. The curvature radius of the lens data is positive when a surface is convex toward the object side, and negative when a surface is convex toward the image side.

In the lens data of Table 1, DD3 (VARIABLE), DD9 (VARIABLE), DD19 (VARIABLE), DD21 (VARIABLE) and DD23 (VARIABLE) are written in the rows of surface distances corresponding to a distance between first lens group G1 and second lens group G2, a distance between second lens group G2 and aperture stop St, a distance between third lens group G3 and fourth lens group G4, a distance between fourth lens group G4 and optical member PP, and a distance between optical member PP and an image formation surface, respectively, which change when magnification is changed.

In the lens data of Table 1, mark * is attached to the surface number of an aspherical surface. Table 1 shows, as the curvature radius of the aspherical surface, the numerical value of a paraxial curvature radius. The aspherical surface data in Table 2 show surface numbers Si of aspherical surfaces, and aspheric coefficients related to the aspherical surfaces. The aspheric coefficients are coefficients KA, Am (m=3, 4, 5, . . . 20) in the following aspherical equation (A):

$$Zd = C \cdot h^2 / \{1. + (1 - KA \cdot C^2 \cdot h^2)^{1/2}\} + \Sigma Am \cdot h^m \quad \text{(A), where}$$

Zd: the depth of an aspherical surface (the length of a perpendicular from a point on the aspherical surface at height h to a flat plane that contacts with the vertex of the aspherical surface and is perpendicular to the optical axis), h: a height (the length from the optical axis to the lens surface), C: the reciprocal of a paraxial curvature radius, and KA, Am: aspheric coefficients (m=3, 4, 5, . . . 20).

Table 3 shows variable magnification data and various data. The variable magnification data in Table 3 show focal length f of the entire system and values of surface distances DD3, DD9, DD19, DD21 and DD23 at a wide angle end, at middle and at a telephoto end. Further, the various data in Table 3 show values of a zoom magnification ratio (variable magnification ratio), focal length f, back focus Bf (distance in air), F-number Fno, and full angle 2ω of view at each position of a wide angle end, middle and a telephoto end.

As the unit of Ri, Di and f in Table 1, and the unit of f, DD3, DD9, DD19, DD21 and DD23 in Table 3, and the unit of Zd and h in equation (A), "mm" maybe used. However, since an optical system can be used by proportionally enlarging or proportionally reducing the optical system, the unit is not limited to "mm", and other appropriate units may be used. In Table 3, the unit of full angle 2ω of view is degree.

In Examples 4 through 6, the image-side surface of positive lens L31 is also aspherical in addition to the aspherical surfaces provided in Examples 1 through 3.

Table 19 shows values corresponding to conditional formulas (1) through (6) in Examples 1 through 6. As Table 19 shows, all of Examples 1 through 6 satisfy conditional formulas (1) through (6).

Figure 7:
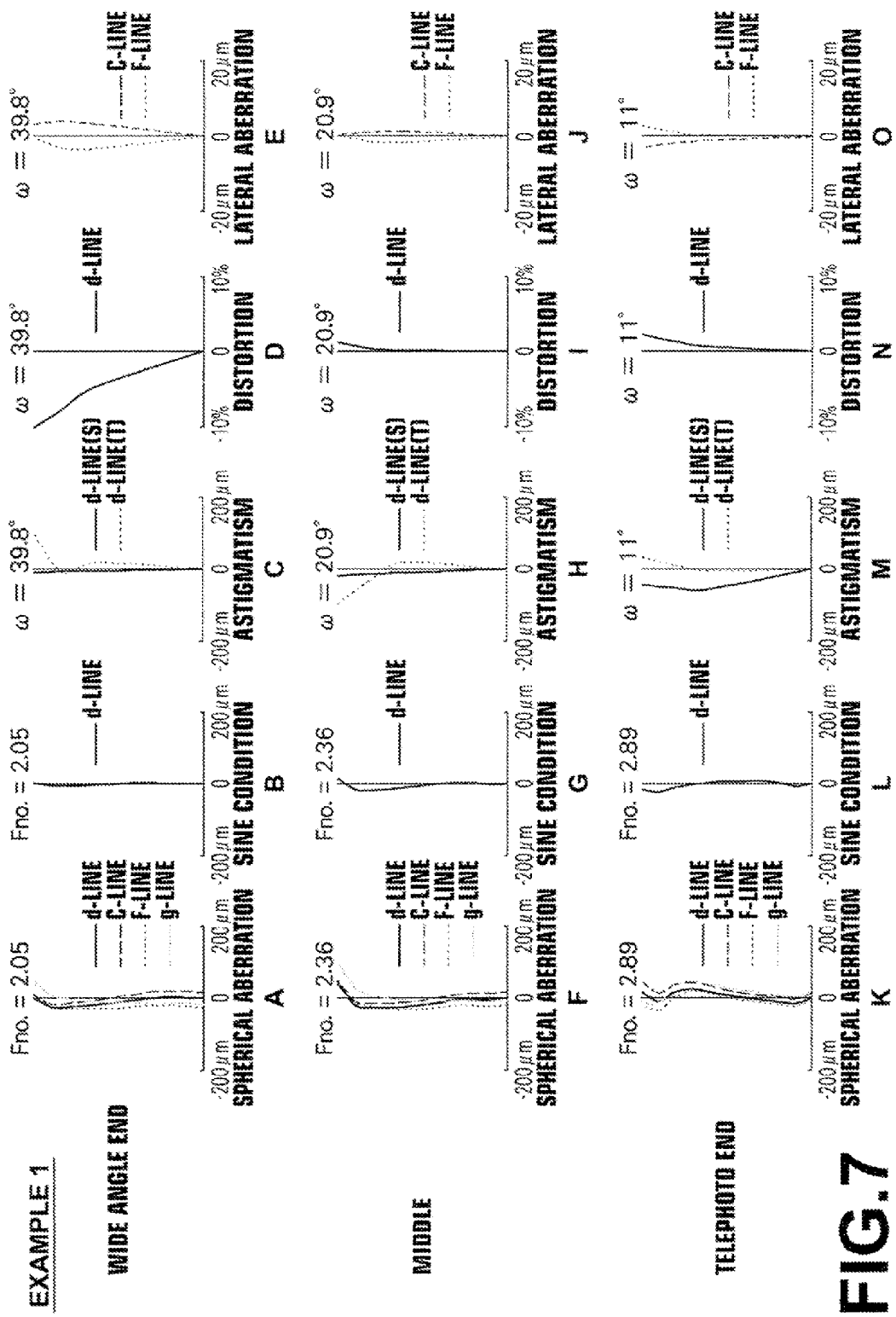
FIG. 7, Sections A through O are aberration diagrams of the zoom, lens in Example 1 of the present invention.

FIG. 7, Sections A through E show aberration diagrams of a spherical aberration, sine condition violation amount (the term "SINE CONDITION" is written in the diagram), astigmatism, distortion (distortion aberration), and a lateral aberration (a lateral chromatic aberration) of the zoom lens of Example 1 at a wide angle end, respectively. FIG. 7, Sections F through J show aberration a diagrams of a spherical aberration, sine condition violation amount (the term "SINE CONDITION" is written in the diagram), astigmatism, distortion (distortion aberration), and a lateral, aberration of the zoom lens of Example 1 in a middle range, respectively. FIG. 7, Sections K through O show aberration diagrams of a spherical aberration, sine condition violation amount (the term "SINE CONDITION" is written in the diagram), astigmatism, distortion (distortion aberration), and a lateral aberration of the zoom lens of Example 1 at a telephoto end, respectively.

The aberration diagrams of the spherical aberration, sine condition violation amount (the term "SINS CONDITION" is written in the diagram), astigmatism, and distortion (distortion aberration) illustrate aberrations when d-line (wavelength is 587.6 nm) is a reference wavelength. The diagrams of the spherical aberration and the lateral aberration, illustrate aberrations for d-line, aberrations for C-line (656.3 nm), aberrations for F-line (wavelength is 486.1 nm) and aberrations for g-line (wavelength is 435.8 nm) by a solid line, a dot dashed line, a double dot dashed line and a gray line, respectively. In the diagram of astigmatism, an aberration in a sagittal direction and an aberration in a tangential direction are indicated by a sold line and a broken line, respectively. In the diagram of the spherical aberration and sine condition violation amount, Fno. represents F-number, and in the other diagrams, ω represents a half angle of view.

Figure 8:
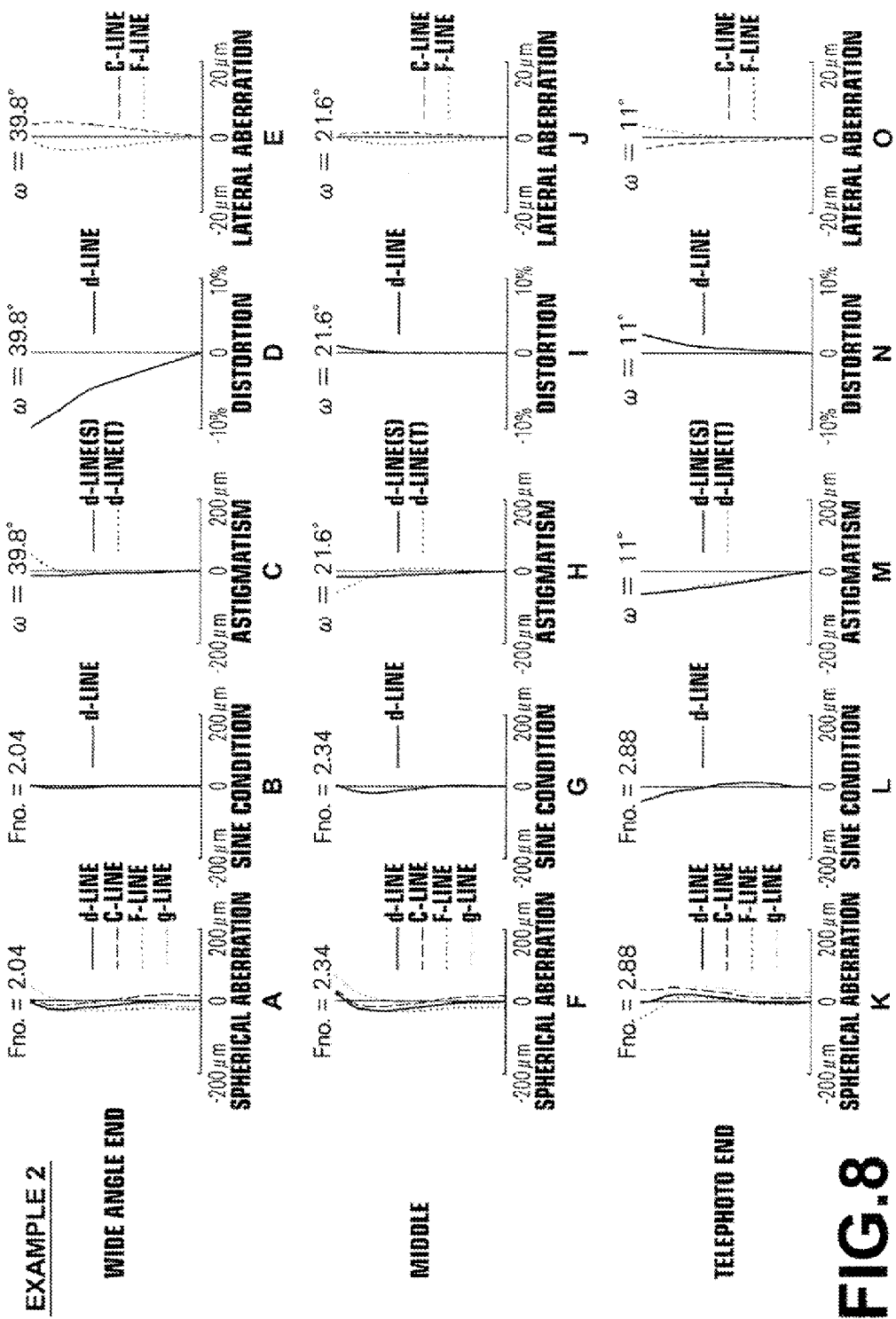
FIG. 8, Sections A through O are aberration diagrams of the zoom lens in Example 2 of the present invention.
Figure 9:
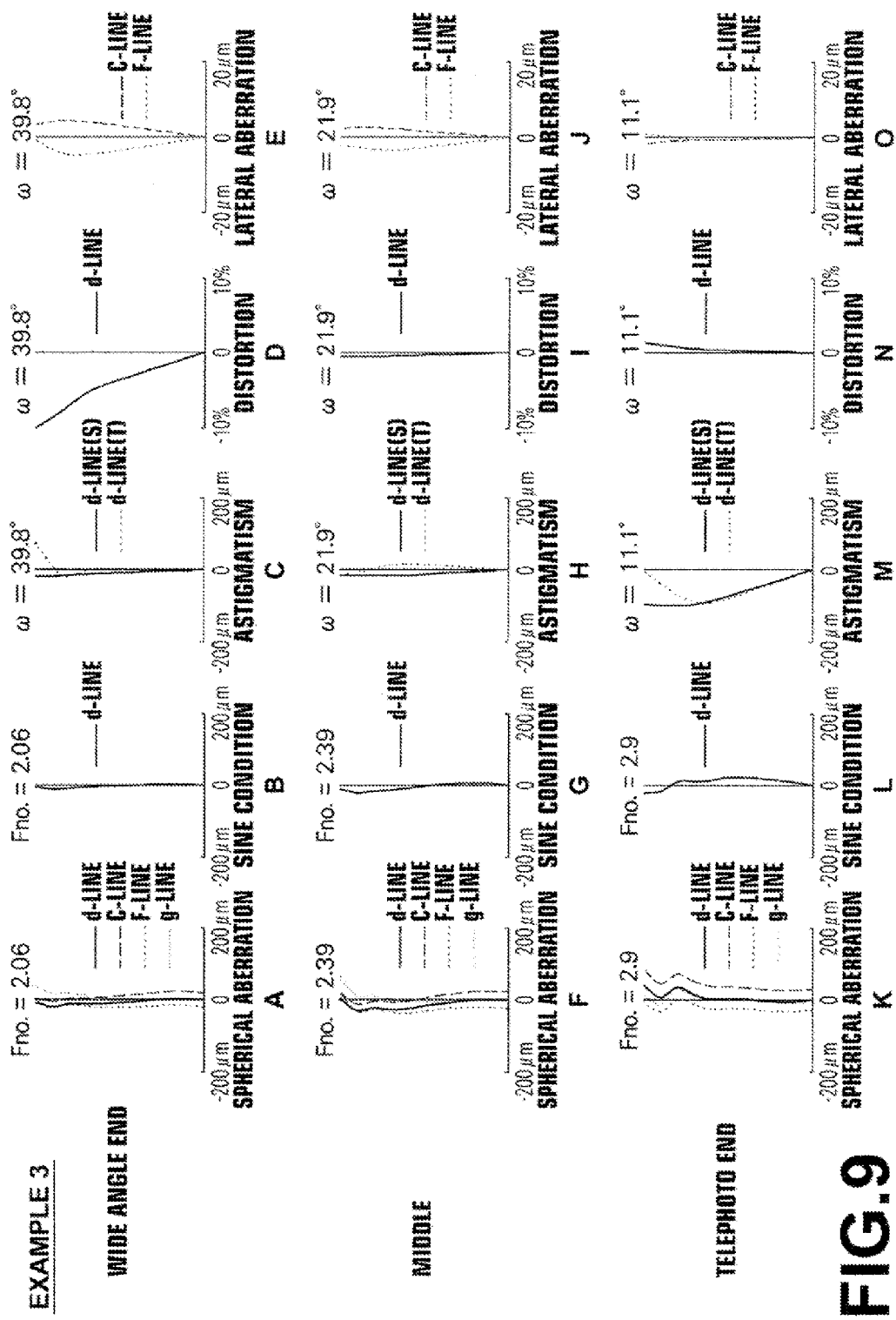
FIG. 9, Sections A through O are aberration diagrams of the zoom lens in Example 3 of the present invention.
Figure 10:
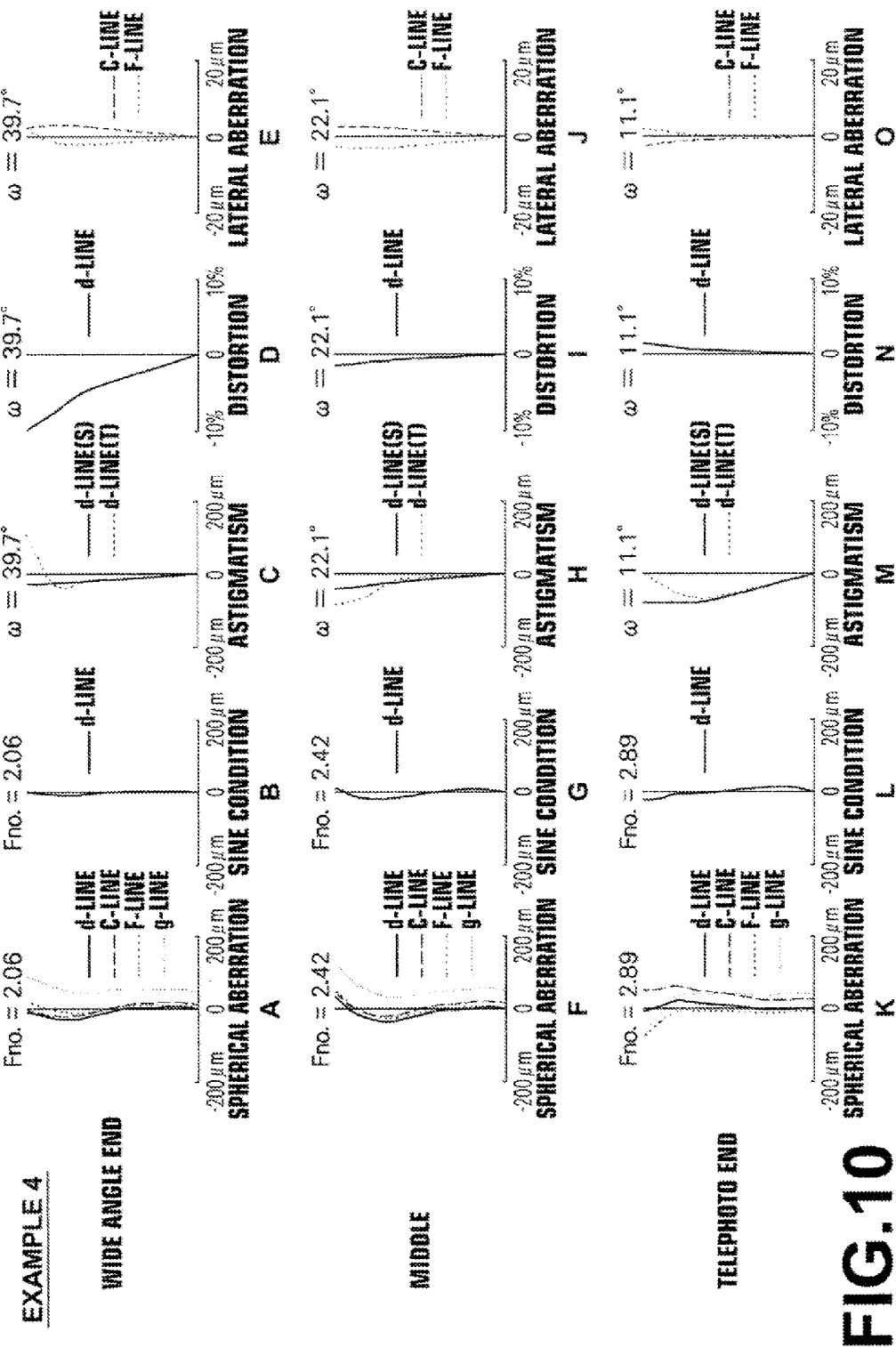
FIG. 10, Sections A through O are aberration diagrams of the zoom lens in Example 4 of the present invention.
Figure 11:
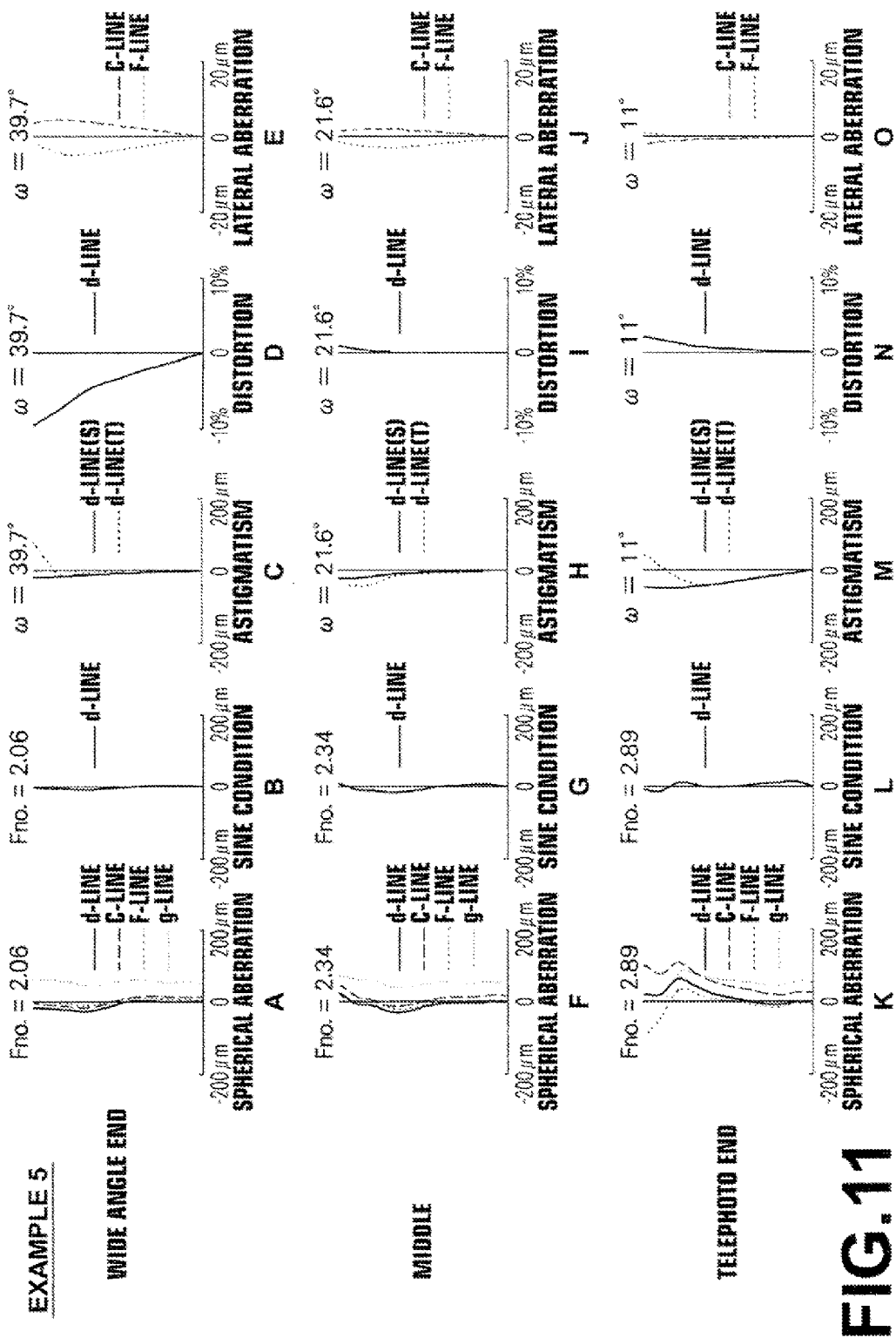
FIG. 11, Sections A through O are aberration diagrams of the zoom lens in Example 5 of the present invention.
Figure 12:
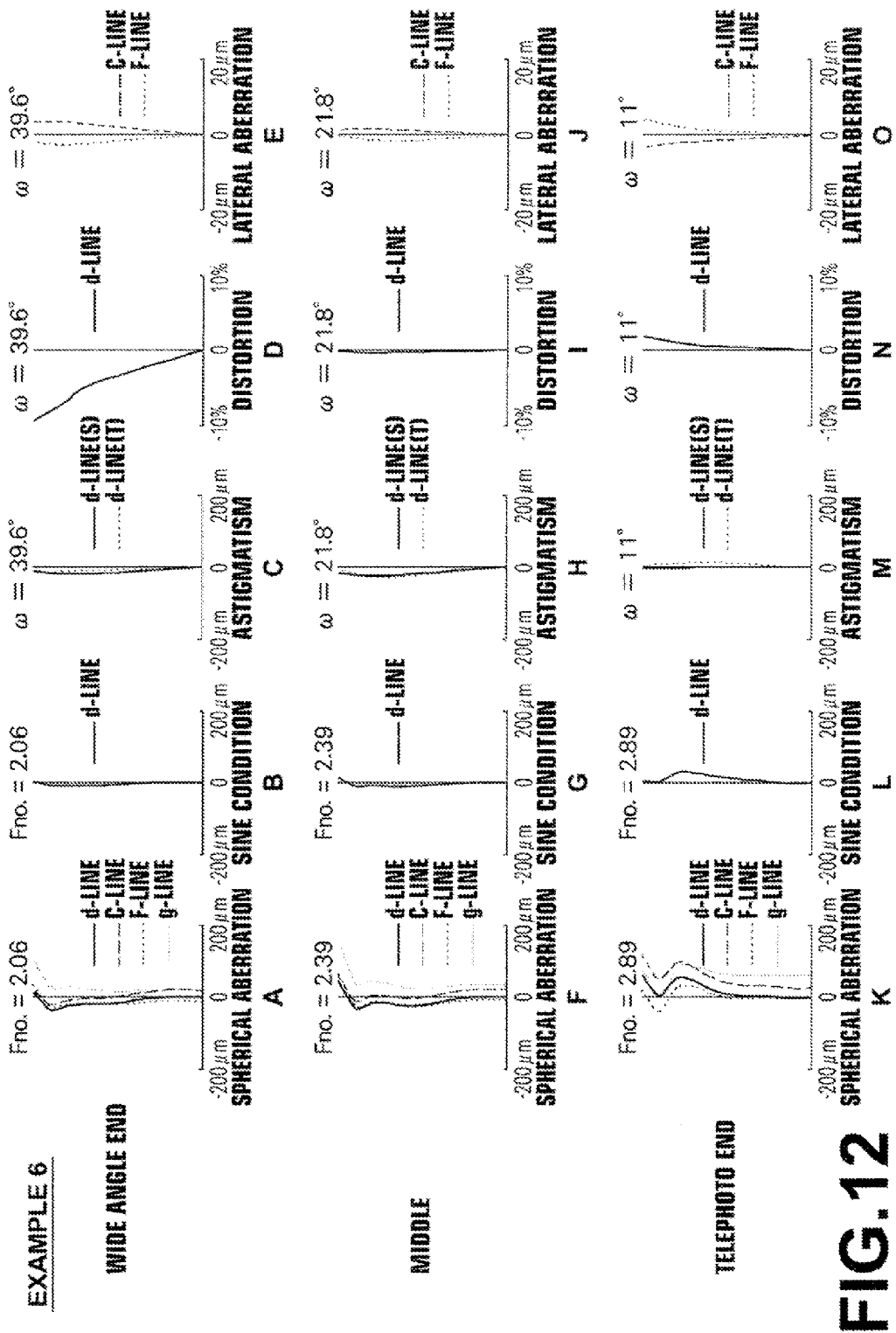
FIG. 12, Sections A through O are aberration diagrams of the zoom lens in Example 6 of the present invention.

Similarly, FIG. 8, Sections A through O illustrate aberrations at a wide angle end, at middle, and at a telephoto end of the zoom lens in Example 2. FIG. 9, Sections A through O illustrate aberrations at a wide angle end, at middle, and at a telephoto end of the zoom lens in Example 3. FIG. 10, Sections A through 0 illustrate aberrations at a wide angle end, at middle, and at a telephoto end of the zoom lens in Example 4. FIG. 11, Sections A through O illustrate aberrations at a wide angle end, at middle, and at a telephoto end of the zoom lens in Example 5. FIG. 12, Sections A through O illustrate aberrations at a wide angle end, at middle, and at a telephoto end of the zoom lens in Example 6.

As the aforementioned data show, the zoom lenses of Examples 1 through 6 have small size, high magnification ratio of about 3.8 times, and excellent optical performance achieving a small Fno. and high image qualities.

Figure 13A:
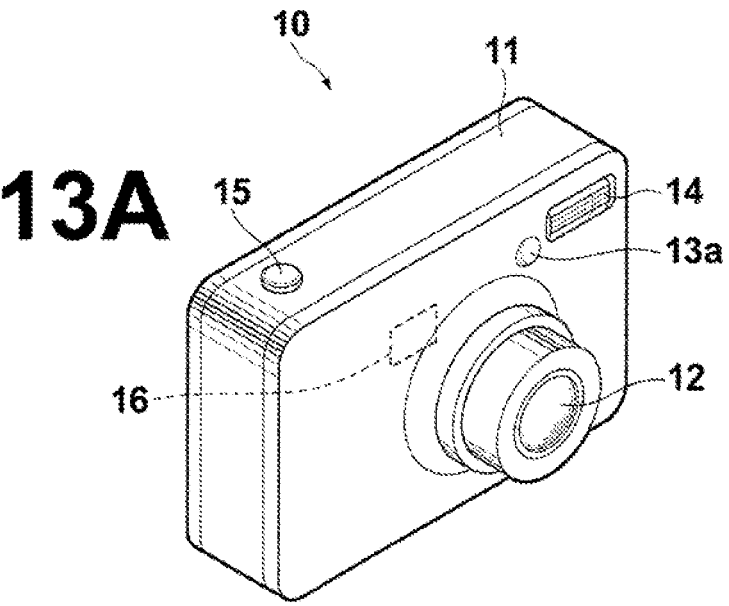
FIG. 13A is a perspective view of the front side of an imaging apparatus according to an embodiment of the present invention.
Figure 13B:
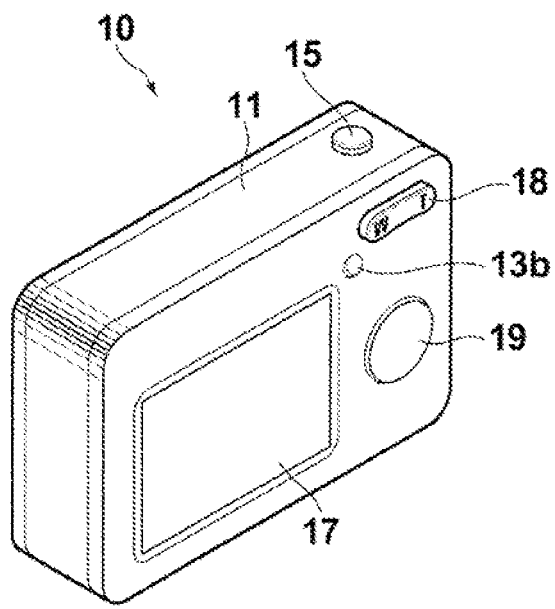
FIG. 13B is a perspective view of the back side of the imaging apparatus according to the embodiment of the present invention.

Next, an embodiment of an imaging apparatus of the present invention will be described. FIG. 13A and FIG. 13B are perspective views of a front side and a back side of a digital camera according to an embodiment of an imaging apparatus of the present invention, respectively.

As illustrated in FIG. 13A, the digital camera 10 includes a zoom lens 12 according to an embodiment of the present invention, an object window 13a of a finder, and a strobe light output apparatus 14, which outputs strobe light to a subject, which are provided on the front side of a camera body 11. Further, a shutter button 15 is provided on the top surface of the camera body 11. Further, an imaging device 16, such as a CCD and a CMOS, is provided in the camera body 11. The imaging device 16 images an image of a subject formed by the zoom lens 12.

As illustrated in FIG. 13B, an LCD (Liquid Crystal Display) 17 for displaying an image and various kinds of setting screen, an observation window 13b of the finder, a zoom lever IS for changing the magnification of the zoom lens 12, and an operation button 19 for performing various kinds of setting are provided on the back side of the camera body 11. The digital camera 10 according to the embodiment of the present invention is structured so that light of a subject guided through the object window 13a of the finder on the front side is recognizable at the observation window 13b of the finder on the back side.

The zoom lens 12 is arranged in such a manner that the direction of the optical axis of the zoom lens 12 is the same as the direction of the thickness of the camera body 11. As described already, the size of the zoom lens 12 according to the embodiment of the present invention is sufficiently small. Therefore, the total length of the optical system in the direction of the optical axis is short when the zoom lens 12 is collapsed and housed into the main body of the camera body 11. Therefore. It is possible to structure the digital camera 10 so that the thickness of the digital camera 10 is thin. Further, since the zoom lens 12 according to the embodiment of the present invention has a wide angle of view and excellent optical performance, the digital camera 10 can perform photography with a wide angle of view, and obtain excellent images.

So far, the present invention has been described by using embodiments and examples. However, the present invention is not limited to the aforementioned embodiments nor examples, and various modifications are possible. For example, the values of the curvature radius, a distance between surfaces, refractive index. Abbe number, and the like of each lens element are not limited to the values in the aforementioned examples of numerical values, but may be other values.

In the zoom lens of the present invention, the lens groups that move during magnification change and the direction of movement is not limited to the aforementioned examples.

In the aforementioned embodiment, a digital camera was described as an example of the imaging apparatus. However, the present invention is not limited to the digital camera. The present invention may be applied to other imaging apparatuses, for example, such as a video camera and a surveillance camera.

TABLE 1

EXAMPLE 1 • BASIC LESS DATA

| Si | Ri | Di | Ndj | vdj |
|---|---|---|---|---|
| 1 | 38.6302 | 1.11 | 1.945945 | 17.98 |
| 2 | 26.9760 | 4.30 | 1.834807 | 42.72 |
| 3 | 371.8467 | DD[3] (VARIABLE) | | |
| 4 | 66.7099 | 1.00 | 1.882997 | 40.76 |
| 5 | 8.4132 | 4.80 | | |
| *6 | −19.0605 | 1.00 | 1.583129 | 59.37 |
| *7 | 55.6768 | 0.40 | | |
| 8 | 24.9067 | 2.50 | 1.922860 | 20.88 |
| 9 | −499.8687 | DD[9] (VARIABLE) | | |
| 10 (APERTURE STOP) | ∞ | 0.85 | | |
| *11 | 14.2177 | 2.50 | 1.803603 | 40.28 |
| 12 | −250.1461 | 0.10 | | |
| 13 | 10.0090 | 3.41 | 1.592824 | 68.62 |
| 14 | −20.8840 | 0.70 | 1.698947 | 30.13 |
| 15 | 7.4062 | 2.10 | | |
| *16 | −10.0000 | 0.90 | 1.803603 | 40.28 |
| *17 | −20.4609 | 0.10 | | |
| 18 | 27.8958 | 2.90 | 1.496999 | 81.54 |
| 19 | −10.0111 | DD[19] (VARIABLE) | | |
| 20 | 14.4956 | 2.80 | 1.487490 | 70.24 |
| 21 | 34.9421 | DD[21] (VARIABLE) | | |
| 22 | ∞ | 2.14 | 1.516798 | 64.20 |
| 23 | ∞ | DD[23] (VARIABLE) | | |

*ASPHERICAL

TABLE 2

EXAMPLE 1 • ASPHERICAL SURFACE DATA

| SURFACE NUMBER | KA | A3 | A4 | A5 | A6 |
|---|---|---|---|---|---|
| 6 | −4.148111E+00 | 1.150223E−03 | −6.585878E−04 | 1.685927E−04 | −1.904884E−06 |
| 7 | −9.950295E+00 | 9.646437E−04 | −4.885791E−04 | 1.432608E−04 | −3.875323E−06 |
| 11 | 3.660046E+00 | −4.036084E−05 | −5.899152E−05 | −3.723504E−05 | 1.055957E−05 |
| 16 | −8.971192E+00 | −7.781902E−04 | −8.305061E−04 | −2.230827E−05 | −1.358257E−05 |
| 17 | −5.658450E+00 | −8.424122E−04 | 7.988741E−04 | −2.765325E−04 | 4.453843E−05 |

| | A7 | A8 | A9 | A10 | A11 |
|---|---|---|---|---|---|
| 6 | −5.155217E−06 | 4.256246E−08 | 1.426374E−07 | −1.188533E−08 | 0.000000E+00 |
| 7 | −4.241185E−06 | 9.597971E−08 | 1.081173E−07 | −9.188089E−09 | 0.000000E+00 |
| 11 | −9.760767E−07 | −4.976513E−07 | 1.682713E−07 | −2.503631E−08 | 2.157418E−09 |
| 16 | 1.334413E−05 | 2.007369E−06 | −1.003647E−06 | −1.949607E−07 | 8.686077E−08 |
| 17 | 2.895206E−06 | 3.897227E−07 | −7.739047E−07 | 1.551732E−07 | −1.172742E−08 |

| | A12 | A13 | A14 | A15 | A16 |
|---|---|---|---|---|---|
| 6 | 0.000000E+00 | 0.000000E+00 | 0.000000E+00 | 0.000000E+00 | 0.000000E+00 |
| 7 | 0.000000E+00 | 0.000000E+00 | 0.000000E+00 | 0.000000E+00 | 0.000000E+00 |
| 11 | −1.060850E−10 | 0.000000E+00 | 0.000000E+00 | 0.000000E+00 | 0.000000E+00 |
| 16 | −7.236734E−09 | 0.000000E+00 | 0.000000E+00 | 0.000000E+00 | 0.000000E+00 |
| 17 | 3.933323E−10 | 0.000000E+00 | 0.000000E−00 | 0.000000E+00 | 0.000000E+00 |

| | A17 | A18 | A19 | A20 |
|---|---|---|---|---|
| 6 | 0.000000E+00 | 0.000000E+00 | 0.000000E+00 | 0.000000E+00 |
| 7 | 0.000000E+00 | 0.000000E+00 | 0.000000E+00 | 0.000000E+00 |
| 11 | 0.000000E+00 | 0.000000E+00 | 0.000000E+00 | 0.000000E+00 |
| 18 | 0.000000E+00 | 0.000000E+00 | 0.000000E+00 | 0.000000E+00 |
| 17 | 0.000000E+00 | 0.000000E+00 | 0.000000E+00 | 0.000000E+00 |

TABLE 3

|  | DD3 | DD9 | DD19 | DD21 | DD23 |
|---|---|---|---|---|---|
| WIDE ANGLE END | 0.40 | 19.85 | 6.77 | 4.10 | 0.61 |
| MIDDLE | 9.03 | 8.57 | 10.00 | 5.55 | 0.61 |
| TELEPHOTO END | 16.30 | 1.70 | 18.20 | 4.65 | 0.63 |

|  | ZOOM MAGNIFICATION RATIO | f | Bf | FNo. | 2ω[°] |
|---|---|---|---|---|---|
| WIDE ANGLE END | 1.0 | 7.34 | 6.12 | 2.05 | 79.65 |
| MIDDLE | 1.9 | 14.25 | 7.57 | 2.36 | 41.74 |
| TELEPHOTO END | 3.8 | 27.68 | 6.69 | 2.89 | 21.99 |

TABLE 4

EXAMPLE 2 • BASIC LENS DATA

| Si | Ri | Di | Ndj | vdj |
|---|---|---|---|---|
| 1 | 38.8045 | 1.11 | 1.945945 | 17.98 |
| 2 | 27.0005 | 4.30 | 1.834807 | 42.72 |
| 3 | 380.0468 | DD[3] (VARIABLE) | | |
| 4 | 68.4586 | 1.00 | 1.882997 | 40.76 |
| 5 | 8.3999 | 4.80 | | |
| *6 | −17.9999 | 1.00 | 1.583129 | 59.37 |
| *7 | 67.5844 | 0.40 | | |
| 8 | 24.7817 | 2.50 | 1.922860 | 20.88 |
| 9 | −499.9100 | DD[9] (VARIABLE) | | |
| 10 (APERTURE STOP) | ∞ | 0.85 | | |
| *11 | 13.1753 | 2.58 | 1.803603 | 40.28 |
| 12 | −578.7547 | 0.10 | | |
| 13 | 10.0014 | 3.21 | 1.592824 | 68.62 |
| 14 | −18.4906 | 0.70 | 1.698947 | 30.13 |
| 15 | 7.3999 | 2.10 | | |
| *16 | −10.0005 | 0.90 | 1.803603 | 40.28 |
| *17 | −20.4695 | 0.10 | | |
| 18 | 32.2050 | 2.80 | 1.496999 | 81.54 |
| 19 | −10.0000 | DD[19] (VARIABLE) | | |
| 20 | 14.5002 | 2.73 | 1.487490 | 70.24 |
| 21 | 38.3870 | DD[21] (VARIABLE) | | |
| 22 | ∞ | 2.14 | 1.516798 | 64.20 |
| 23 | ∞ | DD[23] (VARIABLE) | | |

*ASPHERICAL

TABLE 5

EXAMPLE 2 • ASPHERICAL SURFACE DATA

| SURFACE NUMBER | KA | A3 | A4 | A5 | A6 |
|---|---|---|---|---|---|
| 6 | −2.901062E+00 | 8.558786E−04 | −1.423880E−04 | 9.747104E−07 | 1.874475E−05 |
| 7 | −2.888808E+00 | 7.638394E−04 | −1.343401E−04 | 5.018857E−05 | −1.876250E−06 |
| 11 | 1.352686E+00 | 1.708472E−04 | 5.961844E−06 | −2.369872E−05 | 9.712858E−06 |
| 16 | −9.037268E+00 | −8.568306E−04 | −1.018321E−03 | −4.797970E−05 | −6.757228E−06 |
| 17 | −4.803615E+00 | −8.074333E−04 | 5.413725E−04 | −2.171972E−04 | 3.686978E−05 |

| | A7 | A8 | A9 | A10 | A11 |
|---|---|---|---|---|---|
| 6 | −4.872749E−06 | −7.936079E−08 | 1.190545E−07 | −9.066170E−09 | 0.000000E+00 |
| 7 | −1.919143E−06 | −2.189706E−08 | 6.609442E−08 | −5.362158E−09 | 0.000000E+00 |
| 11 | −1.021325E−06 | −4.651846E−07 | 1.765433E−07 | −2.439530E−08 | 1.513925E−09 |
| 16 | 1.563414E−05 | 2.015413E−06 | −1.114956E−06 | −2.168310E−07 | 8.793595E−08 |
| 17 | 1.853103E−06 | 9.756923E−07 | −6.492602E−07 | 1.301679E−07 | −2.479634E−08 |

| | A12 | A13 | A14 | A15 | A16 |
|---|---|---|---|---|---|
| 6 | 0.000000E+00 | 0.000000E+00 | 0.000000E+00 | 0.000000E+00 | 0.000000E+00 |
| 7 | 0.000000E+00 | 0.000000E+00 | 0.000000E+00 | 0.000000E+00 | 0.000000E+00 |
| 11 | −3.537663E−11 | 0.000000E+00 | 0.000000E+00 | 0.000000E+00 | 0.000000E+00 |
| 16 | −6.120171E−09 | 0.000000E+00 | 0.000000E+00 | 0.000000E+00 | 0.000000E+00 |
| 17 | 2.767444E−09 | 0.000000E+00 | 0.000000E+00 | 0.000000E+00 | 0.000000E+00 |

| | A17 | A18 | A19 | A20 |
|---|---|---|---|---|
| 6 | 0.000000E+00 | 0.000000E+00 | 0.000000E+00 | 0.000000E+00 |
| 7 | 0.000000E+00 | 0.000000E+00 | 0.000000E+00 | 0.000000E+00 |
| 11 | 0.000000E+00 | 0.000000E+00 | 0.000000E+00 | 0.000000E+00 |
| 16 | 0.000000E+00 | 0.000000E+00 | 0.000000E+00 | 0.000000E+00 |
| 17 | 0.000000E+00 | 0.000000E+00 | 0.000000E+00 | 0.000000E+00 |

TABLE 6

|  | DD3 | DD9 | DD19 | DD21 | DD23 |
|---|---|---|---|---|---|
| WIDE ANGLE END | 0.40 | 19.56 | 6.67 | 4.11 | 0.60 |
| MIDDLE | 8.42 | 8.86 | 10.00 | 5.32 | 0.61 |
| TELEPHOTO END | 16.67 | 1.86 | 18.20 | 4.31 | 0.62 |

|  | ZOOM MAGNIFICATION RATIO | f | Bf | FNo. | 2ω[°] |
|---|---|---|---|---|---|
| WIDE ANGLE END | 1.0 | 7.34 | 6.12 | 2.04 | 79.51 |
| MIDDLE | 1.9 | 13.76 | 7.34 | 2.34 | 43.16 |
| TELEPHOTO END | 3.8 | 27.67 | 6.34 | 2.88 | 21.92 |

TABLE 7

EXAMPLE 3 • BASIC LENS DATA

| Si | Ri | Di | Ndj | vdj |
|---|---|---|---|---|
| 1 | 37.9403 | 1.11 | 1.945945 | 17.98 |
| 2 | 27.0005 | 4.40 | 1.834807 | 42.72 |
| 3 | 267.9507 | DD[3] (VARIABLE) | | |
| 4 | 53.7371 | 1.00 | 1.882997 | 40.76 |
| 5 | 8.3999 | 4.80 | | |
| *6 | −17.9997 | 1.00 | 1.583129 | 59.37 |
| *7 | 42.2299 | 0.40 | | |
| 8 | 23.0485 | 2.50 | 1.922860 | 20.88 |
| 9 | −2490.0276 | DD[9] (VARIABLE) | | |
| 10 (APERTURE STOP) | ∞ | 0.85 | | |
| *11 | 12.5989 | 2.50 | 1.690010 | 41.12 |
| 12 | −249.9775 | 0.10 | | |
| 13 | 10.0000 | 3.21 | 1.610009 | 60.77 |
| 14 | 42.5880 | 0.80 | 1.849991 | 22.50 |
| 15 | 7.3999 | 2.00 | | |
| *16 | −10.0000 | 0.90 | 1.803603 | 40.28 |
| *17 | −10.5367 | 0.10 | | |
| 18 | 24.0114 | 2.80 | 1.496999 | 81.54 |
| 19 | −22.4908 | DD[19] (VARIABLE) | | |
| 20 | 14.5002 | 3.20 | 1.487490 | 70.24 |
| 21 | 31.5414 | DD[21] (VARIABLE) | | |
| 22 | ∞ | 2.14 | 1.516798 | 64.20 |
| 23 | ∞ | DD[23] (VARIABLE) | | |

*ASPHERICAL

TABLE 8

EXAMPLE 3 • ASPHERICAL SURFACE DATA

| SURFACE NUMBER | KA | A3 | A4 | A5 | A6 |
|---|---|---|---|---|---|
| 6 | −2.195867E+00 | 1.451722E−03 | −5.679539E−04 | 9.365583E−05 | 6.756593E−06 |
| 7 | −7.362588E+00 | 1.189265E−03 | −3.348586E−04 | 2.996977E−05 | 1.385687E−05 |
| 11 | 6.772946E−01 | −1.673881E−05 | −6.349202E−06 | −2.634617E−05 | 1.085399E−05 |
| 16 | −1.000001E+01 | −6.291315E−04 | −9.338862E−04 | −7.319346E−05 | 1.710857E−06 |
| 17 | −1.443278E+00 | −5.592344E−04 | 2.239497E−04 | −1.743068E−04 | 2.507030E−05 |

| | A7 | A8 | A9 | A10 | A11 |
|---|---|---|---|---|---|
| 6 | −4.083758E−06 | 1.698074E−07 | 5.580922E−08 | −5.102811E−09 | 0.000000E+00 |
| 7 | −2.861938E−06 | −2.852082E−07 | 1.035360E−07 | −6.678674E−09 | 0.000000E+00 |
| 11 | −1.001754E−06 | −5.301758E−07 | 1.684358E−07 | −2.296807E−08 | 2.358925E−09 |
| 16 | 1.552819E−05 | 1.285019E−06 | −1.196719E−06 | −1.659198E−07 | 1.060260E−07 |
| 17 | −1.314004E−06 | 1.123214E−06 | −4.864124E−07 | 1.492133E−07 | −2.943818E−08 |

| | A12 | A13 | A14 | A15 | A16 |
|---|---|---|---|---|---|
| 6 | 0.000000E+00 | 0.000000E+00 | 0.000000E+00 | 0.000000E+00 | 0.000000E+00 |
| 7 | 0.000000E+00 | 0.000000E+00 | 0.000000E+00 | 0.000000E+00 | 0.000000E+00 |
| 11 | −1.538920E−10 | 0.000000E+00 | 0.000000E+00 | 0.000000E+00 | 0.000000E+00 |
| 16 | −1.076075E−08 | 0.000000E+00 | 0.000000E+00 | 0.000000E+00 | 0.000000E+00 |
| 17 | 2.133647E−09 | 0.000000E+00 | 0.000000E+00 | 0.000000E+00 | 0.000000E+00 |

| | A17 | A18 | A19 | A20 |
|---|---|---|---|---|
| 6 | 0.000000E+00 | 0.000000E+00 | 0.000000E+00 | 0.000000E+00 |
| 7 | 0.000000E+00 | 0.000000E+00 | 0.000000E+00 | 0.000000E+00 |
| 11 | 0.000000E+00 | 0.000000E+00 | 0.000000E+00 | 0.000000E+00 |
| 16 | 0.000000E+00 | 0.000000E+00 | 0.000000E+00 | 0.000000E+00 |
| 17 | 0.000000E+00 | 0.000000E+00 | 0.000000E+00 | 0.000000E+00 |

TABLE 9

| | DD3 | DD9 | DD19 | DD21 | DD23 |
|---|---|---|---|---|---|
| WIDE ANGLE END | 0.40 | 19.33 | 7.00 | 3.48 | 0.51 |
| MIDDLE | 7.91 | 8.59 | 9.89 | 5.19 | 0.62 |
| TELEPHOTO END | 16.76 | 1.79 | 16.83 | 5.20 | 0.64 |

| | ZOOM MAGNIFICATION RATIO | f | Bf | FNo. | 2ω [°] |
|---|---|---|---|---|---|
| WIDE ANGLE END | 1.0 | 7.34 | 5.50 | 2.06 | 79.54 |
| MIDDLE | 1.9 | 13.76 | 7.22 | 2.39 | 43.74 |
| TELEPHOTO END | 3.8 | 27.67 | 7.25 | 2.90 | 22.19 |

TABLE 10

EXAMPLE 4 • BASIC LENS DATA

| Si | Ri | Di | Ndj | vdj |
|---|---|---|---|---|
| 1 | 37.7431 | 1.11 | 1.945945 | 17.98 |
| 2 | 27.0009 | 4.30 | 1.834807 | 42.72 |
| 3 | 230.8905 | DD[3] (VARIABLE) | | |
| 4 | 52.5088 | 1.00 | 1.882997 | 40.76 |
| 5 | 8.3999 | 4.80 | | |
| *6 | −17.9999 | 1.00 | 1.568572 | 58.50 |
| *7 | 38.9329 | 0.40 | | |
| 8 | 20.7051 | 2.25 | 1.922860 | 20.88 |

TABLE 10-continued

EXAMPLE 4 • BASIC LENS DATA

| Si | Ri | Di | Ndj | vdj |
|---|---|---|---|---|
| 9 | 499.9378 | DD[9] (VARIABLE) | | |
| 10 (APERTURE STOP) | ∞ | 0.85 | | |
| *11 | 13.4221 | 2.50 | 1.693500 | 53.20 |
| *12 | 500.0000 | 0.10 | | |
| 13 | 10.0000 | 2.81 | 1.834000 | 37.16 |
| 14 | 429.9398 | 0.80 | 1.846660 | 23.78 |
| 15 | 7.3999 | 2.00 | | |
| *16 | −10.0000 | 0.80 | 1.806100 | 40.73 |
| *17 | −23.4415 | 0.10 | | |
| 18 | 22.2529 | 2.80 | 1.496999 | 81.54 |
| 19 | −10.0000 | DD[19] (VARIABLE) | | |
| 20 | 14.5805 | 3.20 | 1.487490 | 70.24 |
| 21 | 33.3251 | DD[21] (VARIABLE) | | |
| 22 | ∞ | 2.14 | 1.516798 | 64.20 |
| 23 | ∞ | DD[23] (VARIABLE) | | |

*ASPHERICAL

TABLE 12

| | DD3 | DD9 | DD19 | DD21 | DD23 |
|---|---|---|---|---|---|
| WIDE ANGLE END | 0.40 | 19.68 | 6.69 | 4.29 | 0.60 |
| MIDDLE | 6.56 | 7.88 | 10.27 | 5.91 | 0.60 |
| TELEPHOTO END | 17.18 | 1.71 | 17.58 | 4.87 | 0.62 |

| | ZOOM MAGNIFICATION RATIO | f | Bf | FNo. | 2ω [°] |
|---|---|---|---|---|---|
| WIDE ANGLE END | 1.0 | 7.34 | 6.30 | 2.06 | 79.45 |
| MIDDLE | 1.9 | 13.76 | 7.92 | 2.42 | 44.14 |
| TELEPHOTO END | 3.8 | 27.67 | 6.90 | 2.89 | 22.16 |

TABLE 11

EXAMPLE 4 • ASPHERICAL SURFACE DATA

| SURFACE NUMBER | KA | A3 | A4 | A5 | A6 |
|---|---|---|---|---|---|
| 6 | 3.381383E+00 | 1.566718E−03 | −6.415315E−04 | 2.631117E−04 | −2.370265E−05 |
| 7 | −1.000000E+01 | 1.302736E−03 | −5.009606E−04 | 1.824182E−04 | −1.011940E−05 |
| 11 | −3.115896E−01 | −2.190814E−05 | 4.850561E−05 | −1.653513E−05 | 7.233219E−06 |
| 12 | −9.999828E+00 | 9.277381E−05 | −1.353852E−04 | 3.609310E−05 | −5.943203E−07 |
| 16 | −5.733759E+00 | 4.503320E−04 | −7.342864E−04 | −3.204549E−05 | 3.248507E−05 |
| 17 | −9.377180E+00 | 2.994306E−04 | 3.831456E−04 | −9.283260E−05 | 2.399954E−05 |

| | A7 | A8 | A9 | A10 | A11 |
|---|---|---|---|---|---|
| 6 | −3.590459E−06 | 1.946031E−07 | 1.109239E−07 | −1.018293E−08 | 0.000000E+00 |
| 7 | −4.111293E−06 | −2.413154E−08 | 1.472820E−07 | −1.200901E−08 | 0.000000E+00 |
| 11 | 7.160280E−07 | −9.648388E−08 | −3.066909E−08 | −6.189859E−09 | 2.557052E−09 |
| 12 | 2.368305E−07 | 1.290118E−07 | −8.222094E−09 | −3.900609E−09 | −1.161591E−09 |
| 16 | 8.088889E−06 | −1.209053E−07 | −2.884267E−07 | −1.603354E−07 | 2.188047E−08 |
| 17 | 6.456346E−06 | 4.098905E−07 | −5.675292E−07 | −4.766191E−08 | 1.866775E−08 |

| | A12 | A13 | A14 | A15 | A16 |
|---|---|---|---|---|---|
| 6 | 0.000000E+00 | 0.000000E+00 | 0.000000E+00 | 0.000000E+00 | 0.000000E+00 |
| 7 | 0.000000E+00 | 0.000000E+00 | 0.000000E+00 | 0.000000E+00 | 0.000000E+00 |
| 11 | −1.329708E−10 | 0.000000E+00 | 0.000000E+00 | 0.000000E+00 | 0.000000E+00 |
| 12 | 2.883796E−10 | 0.000000E+00 | 0.000000E+00 | 0.000000E+00 | 0.000000E+00 |
| 16 | 1.811706E−09 | 0.000000E+00 | 0.000000E+00 | 0.000000E+00 | 0.000000E+00 |
| 17 | −5.592284E−11 | 0.000000E+00 | 0.000000E+00 | 0.000000E+00 | 0.000000E+00 |

| | A17 | A18 | A19 | A20 |
|---|---|---|---|---|
| 6 | 0.000000E+00 | 0.000000E+00 | 0.000000E+00 | 0.000000E+00 |
| 7 | 0.000000E+00 | 0.000000E+00 | 0.000000E+00 | 0.000000E+00 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 16 | 0.000000E+00 | 0.000000E+00 | 0.000000E+00 | 0.000000E+00 |
| 17 | 0.000000E+00 | 0.000000E+00 | 0.000000E+00 | 0.000000E+00 |

TABLE 13

EXAMPLE 5 • BASIC LENS DATA

| Si | Ri | Di | Ndj | vdj |
|---|---|---|---|---|
| 1 | 37.5580 | 1.11 | 1.945945 | 17.98 |
| 2 | 27.0008 | 4.30 | 1.834807 | 42.72 |
| 3 | 238.1879 | DD[3] (VARIABLE) | | |
| 4 | 56.2719 | 1.00 | 1.882997 | 40.76 |
| 5 | 8.3999 | 4.80 | | |
| *6 | −19.9305 | 1.00 | 1.588672 | 58.50 |
| *7 | 35.8929 | 0.40 | | |
| 8 | 21.3952 | 2.25 | 1.922860 | 20.88 |
| 9 | 567.9370 | DD[9] (VARIABLE) | | |
| 10 (APERTURE STOP) | ∞ | 0.85 | | |
| *11 | 13.4382 | 2.50 | 1.693500 | 53.20 |
| *12 | 500.0000 | 0.10 | | |
| 13 | 10.0000 | 2.81 | 1.834000 | 37.16 |
| 14 | −158.5030 | 0.80 | 1.846660 | 23.78 |
| 15 | 7.4000 | 2.00 | | |
| *16 | −10.0000 | 0.80 | 1.806100 | 40.73 |
| *17 | −17.0571 | 0.10 | | |
| 18 | 50.4287 | 2.80 | 1.496999 | 81.54 |
| 19 | −10.0000 | DD[19] (VARIABLE) | | |
| 20 | 18.7589 | 3.20 | 1.487490 | 70.24 |
| 21 | 106.8253 | DD[21] (VARIABLE) | | |
| 22 | ∞ | 2.14 | 1.516798 | 64.20 |
| 23 | ∞ | DD[23] (VARIABLE) | | |

*ASPHERICAL

TABLE 14

EXAMPLE 5 • ASPHERICAL SURFACE DATA

| SURFACE NUMBER | KA | A3 | A4 | A5 | A6 |
|---|---|---|---|---|---|
| 6 | 2.499953E+00 | 1.319306E−03 | −7.806722E−04 | 2.825485E−04 | −2.409285E−05 |
| 7 | −4.882191E+00 | 1.123697E−03 | −6.659234E−04 | 2.162103E−04 | −1.161651E−05 |
| 11 | −4.707829E−01 | 1.006789E−04 | 2.678668E−05 | −5.617534E−06 | 8.872089E−06 |
| 12 | −1.000000E+01 | 1.406091E−04 | −9.143641E−05 | 3.627575E−05 | −9.278819E−07 |
| 16 | −1.814424E+00 | 5.785381E−05 | −6.369264E−04 | −7.446523E−05 | 3.042711E−05 |
| 17 | −4.504401E+00 | 6.540962E−05 | −2.054603E−04 | −4.751325E−05 | 2.374952E−05 |

| | A7 | A8 | A9 | A10 | A11 |
|---|---|---|---|---|---|
| 6 | −3.725665E−06 | 1.797725E−07 | 1.117347E−07 | −1.005845E−08 | 0.000000E+00 |
| 7 | −4.344847E−06 | −2.258312E−08 | 1.493863E−07 | −1.197183E−08 | 0.000000E+00 |
| 11 | 5.339277E−07 | −1.734921E−07 | −3.217042E−08 | −2.365037E−09 | 3.081870E−09 |
| 12 | 4.295645E−07 | 1.382174E−07 | −1.235312E−08 | −2.092547E−09 | −1.104656E−09 |
| 16 | 8.692003E−06 | −3.133087E−07 | −2.828895E−07 | −1.780109E−07 | 2.735496E−08 |
| 17 | 6.071927E−06 | 3.212973E−07 | −5.388546E−07 | −4.869032E−08 | 1.622629E−08 |

| | A12 | A13 | A14 | A15 | A16 |
|---|---|---|---|---|---|
| 6 | 0.000000E+00 | 0.000000E+00 | 0.000000E+00 | 0.000000E+00 | 0.000000E+00 |
| 7 | 0.000000E+00 | 0.000000E+00 | 0.000000E+00 | 0.000000E+00 | 0.000000E+00 |
| 11 | −2.725243E−10 | 0.000000E+00 | 0.000000E+00 | 0.000000E+00 | 0.000000E+00 |
| 12 | 2.168114E−10 | 0.000000E+00 | 0.000000E+00 | 0.000000E+00 | 0.000000E+00 |
| 16 | 1.153302E−09 | 0.000000E+00 | 0.000000E+00 | 0.000000E+00 | 0.000000E+00 |
| 17 | 4.209564E−10 | 0.000000E+00 | 0.000000E+00 | 0.000000E+00 | 0.000000E+00 |

| | A17 | A18 | A19 | A20 |
|---|---|---|---|---|
| 6 | 0.000000E+00 | 0.000000E+00 | 0.000000E+00 | 0.000000E+00 |
| 7 | 0.000000E+00 | 0.000000E+00 | 0.000000E+00 | 0.000000E+00 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 16 | 0.000000E+00 | 0.000000E+00 | 0.000000E+00 | 0.000000E+00 |
| 17 | 0.000000E+00 | 0.000000E+00 | 0.000000E+00 | 0.000000E+00 |

TABLE 15

| | DD3 | DD9 | DD19 | DD21 | DD23 |
|---|---|---|---|---|---|
| WIDE ANGLE END | 0.40 | 19.53 | 6.59 | 4.53 | 0.60 |
| MIDDLE | 8.92 | 8.83 | 9.29 | 6.02 | 0.60 |
| TELEPHOTO END | 17.04 | 1.71 | 17.51 | 5.08 | 0.62 |

| | ZOOM MAGNIFICATION RATIO | f | Bf | FNo. | 2ω [°] |
|---|---|---|---|---|---|
| WIDE ANGLE END | 1.0 | 7.34 | 6.54 | 2.06 | 79.31 |
| MIDDLE | 1.9 | 13.76 | 8.03 | 2.34 | 43.19 |
| TELEPHOTO END | 3.8 | 27.67 | 7.11 | 2.89 | 22.01 |

TABLE 16

EXAMPLE 6 • BASIC LENS DATA

| Si | Ri | Di | Ndj | vdj |
|---|---|---|---|---|
| 1 | 38.3043 | 1.11 | 1.945945 | 17.98 |
| 2 | 27.0005 | 4.70 | 1.834807 | 42.72 |
| 3 | 335.2144 | DD[3] (VARIABLE) | | |
| 4 | 77.4907 | 1.20 | 1.882997 | 40.76 |
| 5 | 8.3999 | 4.60 | | |
| *6 | −29.2285 | 0.80 | 1.568672 | 58.50 |
| *7 | 16.3034 | 0.60 | | |
| 8 | 19.4501 | 2.40 | 2.000009 | 23.01 |

TABLE 16-continued

EXAMPLE 6 • BASIC LENS DATA

| Si | Ri | Di | Ndj | vdj |
|---|---|---|---|---|
| 9 | 499.9101 | DD[9] (VARIABLE) | | |
| 10 (APERTURE STOP) | ∞ | 0.85 | | |
| *11 | 12.4623 | 2.50 | 1.693500 | 53.20 |
| *12 | −199.9856 | 0.10 | | |
| 13 | 10.0000 | 2.81 | 1.850009 | 31.27 |
| 14 | −43.0891 | 0.80 | 1.859994 | 22.00 |
| 15 | 7.4000 | 2.40 | | |
| *16 | −15.3458 | 0.80 | 1.806100 | 40.73 |
| *17 | −1047.7895 | 0.10 | | |
| 18 | 19.1941 | 2.80 | 1.496999 | 81.54 |
| 19 | −11.8179 | DD[19] (VARIABLE) | | |
| 20 | 14.0000 | 3.20 | 1.487490 | 70.24 |
| 21 | 59.1504 | DD[21] (VARIABLE) | | |
| 22 | ∞ | 0.80 | 1.516798 | 64.20 |
| 23 | ∞ | DD[23] (VARIABLE) | | |

*ASPHERICAL

TABLE 17

EXAMPLE 6 • ASPHERICAL SURFACE DATA

| SURFACE NUMBER | KA | A3 | A4 | A5 | A6 |
|---|---|---|---|---|---|
| 6 | 3.652016E+00 | −5.759874E−04 | 6.691478E−05 | −5.613702E−06 | −1.666941E−07 |
| 7 | 1.347782E+00 | −5.649817E−04 | −4.485573E−05 | −1.002794E−07 | 2.628129E−09 |
| 11 | 4.158355E−01 | 1.725974E−05 | 3.217432E−05 | 5.367633E−07 | −6.738687E−09 |
| 12 | −1.000001E+01 | 4.804821E−05 | 1.474285E−05 | 7.790193E−07 | −4.122212E−07 |
| 16 | 9.191173E−01 | 9.247741E−05 | 2.737999E−05 | 4.084738E−06 | −9.649417E−08 |
| 17 | 1.000001E+01 | 6.119721E−05 | 3.425967E−04 | −1.115583E−06 | −2.701300E−07 |

| | A7 | A8 | A9 | A10 | A11 |
|---|---|---|---|---|---|
| 6 | 5.258255E−08 | 2.944640E−09 | −1.003528E−09 | −5.346513E−11 | 0.000000E+00 |
| 7 | −5.737917E−08 | −5.430559E−09 | 3.661325E−10 | 6.927413E−11 | 0.000000E+00 |
| 11 | −4.971693E−08 | −1.394987E−08 | 2.940655E−10 | 2.267825E−09 | 1.119094E−09 |
| 12 | −2.481244E−08 | 1.621462E−08 | 8.868219E−09 | 1.406381E−09 | 4.162061E−10 |
| 16 | −1.463384E−08 | 1.355128E−09 | 7.297709E−10 | −4.200110E−11 | 5.323193E−11 |
| 17 | 7.020756E−07 | 1.308849E−07 | 6.377499E−09 | −2.213995E−08 | 1.289176E−09 |

| | A12 | A13 | A14 | A15 | A16 |
|---|---|---|---|---|---|
| 6 | 0.000000E+00 | 0.000000E+00 | 0.000000E+00 | 0.000000E+00 | 0.000000E+00 |
| 7 | 0.000000E+00 | 0.000000E+00 | 0.000000E+00 | 0.000000E+00 | 0.000000E+00 |
| 11 | −2.101525E−10 | 0.000000E+00 | 0.000000E+00 | 0.000000E+00 | 0.000000E+00 |
| 12 | −1.227125E−10 | 0.000000E+00 | 0.000000E+00 | 0.000000E+00 | 0.000000E+00 |
| 16 | 3.088436E−11 | 0.000000E+00 | 0.000000E+00 | 0.000000E+00 | 0.000000E+00 |
| 17 | 4.553041E−10 | 0.000000E+00 | 0.000000E+00 | 0.000000E+00 | 0.000000E+00 |

| | A17 | A18 | A19 | A20 |
|---|---|---|---|---|
| 6 | 0.000000E+00 | 0.000000E+00 | 0.000000E+00 | 0.000000E+00 |
| 7 | 0.000000E+00 | 0.000000E+00 | 0.000000E+00 | 0.000000E+00 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 16 | 0.000000E+00 | 0.000000E+00 | 0.000000E+00 | 0.000000E+00 |
| 17 | 0.000000E+00 | 0.000000E+00 | 0.000000E+00 | 0.000000E+00 |

TABLE 18

| | DD3 | DD9 | DD19 | DD21 | DD23 |
|---|---|---|---|---|---|
| WIDE ANGLE END | 0.71 | 17.96 | 6.20 | 4.25 | 0.62 |
| MIDDLE | 7.87 | 7.64 | 8.97 | 6.32 | 0.62 |
| TELEPHOTO END | 17.26 | 1.73 | 15.72 | 6.42 | 0.64 |

| | ZOOM MAGNIFICATION RATIO | f | Bf | FNo. | 2ω [°] |
|---|---|---|---|---|---|
| WIDE ANGLE END | 1.0 | 7.33 | 5.40 | 2.06 | 79.16 |
| MIDDLE | 1.9 | 13.75 | 7.47 | 2.39 | 43.63 |
| TELEPHOTO END | 3.8 | 27.65 | 7.59 | 2.89 | 22.09 |

TABLE 19

| CONDITIONAL FORMULA | EXAMPLE 1 | EXAMPLE 2 | EXAMPLE 3 | EXAMPLE 4 | EXAMPLE 5 | EXAMPLE 6 |
|---|---|---|---|---|---|---|
| (1) (R6 + R7)/(R6 − R7) | −0.490 | −0.579 | −0.402 | −0.368 | −0.286 | 0.284 |
| (2) D7/fw | 0.0545 | 0.0546 | 0.0546 | 0.0546 | 0.0545 | 0.0819 |
| (3) f3/fw | 2.26 | 2.24 | 2.18 | 2.22 | 2.22 | 2.13 |
| (4) f1/fw | 7.43 | 7.46 | 7.58 | 7.73 | 7.63 | 7.44 |
| (5) fw · tanω | 6.12 | 6.10 | 6.10 | 6.10 | 6.08 | 6.06 |
| (6) ω | 39.84 | 39.77 | 39.79 | 39.73 | 39.67 | 39.59 |

What is claimed is:

1. A zoom lens substantially consisting of four lens groups of:
   a first lens group having positive refractive power;
   a second lens group having negative refractive power;
   a third lens group having positive refractive power; and
   a fourth lens group having positive refractive power, which are in this order from an object side; and
   a stop located between a most image-side surface of the second lens group and a most image-side surface of the third lens group,
   wherein distances between the lens groups change when magnification is changed from a wide angle end to a telephoto end, and
   wherein the second lens group consists of a negative lens, a biconcave lens and a positive lens in this order from the object side, and
   wherein the third lens group consists of a positive lens, a cemented lens of a positive lexis and a negative lens, a negative meniscus lens with its concave surface facing the object side, and a biconvex lens, which are in this order from the object side, and
   wherein the following conditional formula (1) is satisfied:

$-0.75<(R6+R7)/(R6-R7)<0.50$ (1), where

R6: a paraxial curvature radius of an object-side surface of the biconcave lens in the second lens group, and
   R7: a paraxial curvature radius of an image-side surface of the biconcave lens in the second lens group.

2. The zoom lens, as defined in claim 1, wherein the following conditional formula (1-1) is satisfied:

$-0.60<(R6+R7)/(R6-R7)<0.30$ (1-1).

3. The zoom lens, as defined in claim 1, wherein the following conditional formula (2) is satisfied:

$0.005<D7/fw<0.150$ (2), where

D7: a distance on an optical axis between the image-side surface of the biconcave lens in the second lens group and an object-side surface of the positive lens in the second lens group, and
   fw: a focal length of an entire lens system at the wide angle end.

4. The zoom lens, as defined in claim 3, wherein the following conditional formula (2-1) is satisfied:

$0.04<D7/fw<0.09$ (2-1).

5. The zoom lens, as defined in claim 1, wherein the following conditional formula (3) is satisfied:

$1.9<f3/fw<2.6$ (3), where f3: a focal length of the third lens group, and
   fw: a focal length of an entire lens system at the wide angle end.

6. The zoom lens, as defined in claim 5, wherein the following conditional formula (3-1) is satisfied:

$2.1<f3/fw<2.3$ (3-1).

7. The zoom lens, as defined in claim 1, wherein the following conditional formula (4) is satisfied:

$6.6<f1/fw<8.5$ (4), where f1: a focal length of the first lens group, and
   fw: a focal length of an entire lens system at the wide angle end.

8. The zoom lens, as defined in claim 1, wherein the following conditional formula (4-1) is satisfied:

$7.3<f1/fw<7.8$ (4-1).

9. The zoom lens, as defined in claim 1, wherein displacement of an image caused by vibration of the zoom lens is corrected by moving the third lens group in a direction orthogonal to an optical axis.

10. An imaging apparatus comprising:
    the zoom lens, as defined in claim 1.

* * * * *